United States Patent
Hibbard

(10) Patent No.: US 10,803,430 B2
(45) Date of Patent: Oct. 13, 2020

(54) SYSTEMS AND METHODS FOR GLOBAL TRANSFERS

(75) Inventor: Mark Hibbard, Chatham, NJ (US)

(73) Assignee: HSBC TECHNOLOGY & SERVICES (USA) INC., Arlington Heights, IL (US)

(*) Notice: Subject to any disclaimer, the term of this patent is extended or adjusted under 35 U.S.C. 154(b) by 0 days.

(21) Appl. No.: 13/561,551

(22) Filed: Jul. 30, 2012

(65) Prior Publication Data

US 2013/0031002 A1    Jan. 31, 2013

Related U.S. Application Data

(60) Provisional application No. 61/513,171, filed on Jul. 29, 2011.

(51) Int. Cl.
G06Q 40/00 (2012.01)
G06Q 20/10 (2012.01)
G06Q 40/04 (2012.01)

(52) U.S. Cl.
CPC ......... G06Q 20/108 (2013.01); G06Q 20/10 (2013.01); G06Q 40/04 (2013.01)

(58) Field of Classification Search
CPC ........ G06Q 40/00; G06Q 40/02; G06Q 20/40; G06Q 20/10; G06Q 20/04; G06Q 20/108
USPC .......................................................... 705/44
See application file for complete search history.

(56) References Cited

U.S. PATENT DOCUMENTS

| | | | |
|---|---|---|---|
| 7,340,433 B1 | 3/2008 | Kay et al. | |
| 7,536,340 B2 | 5/2009 | Dheer et al. | |
| 7,809,636 B1 | 10/2010 | Jou et al. | |
| 7,827,089 B2 | 11/2010 | Sweeting et al. | |
| 7,877,297 B2 | 1/2011 | Gould et al. | |
| 7,886,156 B2 | 2/2011 | Franchi | |
| 7,930,228 B1 | 4/2011 | Hawkins et al. | |
| 2002/0023053 A1* | 2/2002 | Szoc et al. | 705/39 |
| 2004/0107156 A1 | 6/2004 | Levine | |

(Continued)

FOREIGN PATENT DOCUMENTS

WO    WO 2004044822 A2 *    5/2004

OTHER PUBLICATIONS

Lee, Peter ChiKeung; Ghosh, Sumit, "International payments processing in real time a distributed architecture", (Dec. 1, 1994), IEEE computational science & engineering 1.3: pp. 65-79. IEEE.*

(Continued)

*Primary Examiner* — Gregory A Pollock
(74) *Attorney, Agent, or Firm* — Manatt, Phelps & Phillips, LLP

(57) ABSTRACT

A global transfers computer system is configured to facilitate global transfers for customers having a plurality of accounts with different entities in different countries. The global transfer may be a foreign exchange (FX) transfer or a non-FX transfer. The global transfers computer system includes a customer database, a user interface, and at least one computer implementing a global customer data computer application, a global transfers computer application, and/or a foreign exchange computer application. Various embodiments are described, including a computer implemented method for performing global transfers using a global transfers computer system.

29 Claims, 19 Drawing Sheets

(56) References Cited

U.S. PATENT DOCUMENTS

2005/0144061 A1* 6/2005 Rarity et al. .................... 705/10
2012/0036063 A1* 2/2012 Sivapathasundram ......................
G06Q 20/04
705/39

OTHER PUBLICATIONS

International Search Report and Written Opinion from International application No. PCT/US12/48804, dated Oct. 18, 2012.
International Preliminary Report on Patentability from International application No. PCT/US12/48804, dated Aug. 2, 2013. (Corrected IPRP Chapter II).

* cited by examiner

SYSTEMS AND METHODS FOR GLOBAL TRANSFERS

RELATED APPLICATIONS

This application claims the benefit of, and priority to, U.S. Provisional Application No. 61/513,171, filed Jul. 29, 2011, which is incorporated herein by reference in its entirety.

BACKGROUND

Existing systems and methods for international transfer of funds lack consistency and cannot offer the best rates. For example, there are various channels (internet, call center, branch, etc.) and entities that customers can utilize for international transfers. However, there is typically a lack of ownership and global strategy regarding foreign exchange pricing, resulting in each channel and/or entity essentially managing their own foreign exchange market (FX).

In addition, most international transfer systems only provide real time rates for currencies that are considered supported by a certain treasury. Rates used for unsupported currencies are "sheet" rates, not "live" rates, which vary by entity and are not competitive. For transfers involving unsupported currencies, customers are often shown an indicative or sheet rate in a review page; only after the transfer has been executed are the customers shown the final, actual rate. We have determined that this discrepancy between the rates can be considerable, especially for large amounts.

Existing international transfer systems also lack the ability to deal efficiently with outages, during which live or real time rates are temporarily unavailable.

We have developed systems and methods for global transfers that minimize or eliminate such problems, allowing such systems and methods to advantageously provide, for example, consistent, competitive pricing and/or level of service for transfers involving supported and/or unsupported currencies, at any time and/or any location.

SUMMARY

A global transfers computer system 10 comprises a customer database 190 storing customer information for customers 20 having a plurality of accounts (including debit side (DR) customer accounts 222 and credit side (CR) customer accounts 324) with different entities in different countries; a global customer data computer application (GCDU) 402 electronically receiving the customer information, and storing the customer information in said customer database 190; a user interface 12 receiving electronic global transfer instructions from the customer 20; a global transfers computer application 408, implemented by at least one computer, effecting a global transfer from a first account with a first entity in a first country to a second account with a second entity in a second country responsive to the global transfer instructions, wherein the first and second accounts are linked, and wherein the global transfer is a foreign exchange (FX) transfer or a non-FX transfer; and a foreign exchange computer application 412, implemented by the at least one computer, obtaining real time rates for FX transfers by connecting to a treasury via a treasury application programming interface, wherein the foreign exchange application 412 interfaces in real-time with a global treasury computer system 100 to obtain FX rates for currencies supported by a global treasury 106, and wherein the foreign exchange computer application 412 interfaces with a local treasury computer system 200 to obtain FX rates for currencies unsupported by the global treasury 106.

In some embodiments, the foreign exchange application is configured to generate an electronic request for quote (RFQ) 110 to obtain the FX rates, enabling a single deal per transaction.

In some embodiments, the foreign exchange application is configured to cache the real time rates at a predetermined time and to use the cached rates for weekend transfers.

In some embodiments, the user interface is configured so that the FX rate electronically displayed on a review page is the same as the FX rate electronically displayed on a confirmation page, and comprises a final rate.

In some embodiments, the user interface is configured so that the FX rate electronically displayed on a review page comprises an indicative rate responsive to a centralized multi base currency configuration, and the FX rate electronically displayed on a confirmation page comprises a final rate.

In some embodiments, the global transfers application is configured to electronically provide different rates to different customers based on predetermined criteria. In some embodiments, the predetermined criteria comprise at least one of proposition, global proposition, tier, transfer amount, and transaction volume. In some embodiments, the global transfers application is configured to provide different rates to different customers based on global proposition. In some embodiments, the global transfers application is configured to apply a globally consistent default spread for each proposition.

In some embodiments, the global customer data application is configured to perform a linking validation, confirming that the first and second accounts are associated with the same person, and that the first and second accounts are electronically linked.

In some embodiments, the global transfers application is configured to electronically connect with the global customer data application for a transfer authorization electronically retrieving the linking validation result, and electronically retrieving global compliance screening information for the customer from the central customer database.

In some embodiments, when at least one of the first and second accounts has one or more joint parties for whom there is no global compliance screening information in the central customer database, the global transfers application is configured to electronically connect with a third party system for real time global compliance screening for the joint parties.

In some embodiments, the global transfer instructions comprise electronic instructions to perform at least one of an immediate transfer, a future transfer, a recurring transfer, and a transfer history search.

In some embodiments, the global transfers application includes at least one of a computerized customer service representative component and a computerized reconciliation component providing administrative functionality for staff users.

In some embodiments, the global transfers application is configured to perform automated distribution of FX income to the different entities.

In some embodiments, the global transfers application is configured to electronically receive transaction summaries from a plurality of operational and settlement accounts.

In some embodiments, the global transfers application is configured to generate one or more FX income reports reporting FX income by proposition.

In some embodiments, the foreign exchange application is configured to use an electronic request for quote (RFQ) to obtain the FX rates for unsupported currencies using a Foreign Exchange Manager (FXM) computer application, and to use accumulation to apply streamed FX rates for supported currencies using a Foreign Exchange Accumulator (FXA) computer application.

In some embodiments, a computer implemented method for performing global transfers includes electronically receiving customer information, by at least one computer implementing a global customer data computer application; storing the customer information, by the at least one computer implementing the global customer data computer application, in a customer database 190 for customers having a plurality of accounts with different entities in different countries; receiving, by a user interface, electronic global transfer instructions from the customer; effecting a global transfer from a first account with a first entity in a first country to a second account with a second entity in a second country responsive to the global transfer instructions, by at least one computer implementing a global transfers computer application, wherein the first and second accounts are linked, and wherein the global transfer is a foreign exchange (FX) transfer or a non-FX transfer; and obtaining real time rates for FX transfers, by at least one computer implementing a foreign exchange computer application, by connecting to a treasury via a treasury application programming interface, wherein the foreign exchange application interfaces in real-time with a global treasury computer system 100 to obtain FX rates for currencies supported by a global treasury, and wherein the foreign exchange computer application interfaces with a local treasury computer system 200 to obtain FX rates for currencies unsupported by the global treasury.

In some embodiments, the method includes generating, by the at least one computer implementing the foreign exchange computer application, an electronic request for quote (RFQ) to obtain the FX rates, enabling a single deal per transaction.

In some embodiments, the method includes caching the real time rates, by the at least one computer implementing the foreign exchange computer application, at a predetermined time, and using the cached rates for weekend transfers.

In some embodiments, the method includes electronically displaying on a review page, by the user interface, the same FX rate as is electronically displayed on a confirmation page, wherein the FX rate displayed on the review page is a final rate.

In some embodiments, the method includes electronically displaying on a review page, by the user interface, an indicative rate responsive to a centralized multi base currency configuration, and electronically displaying on a confirmation page, by the user interface, a final rate.

In some embodiments, the method includes electronically providing different rates to different customers, by the at least one computer implementing the global transfers computer application, based on predetermined criteria. In some embodiments, the predetermined criteria comprise at least one of proposition, global proposition, tier, transfer amount, and transaction volume. In some embodiments, the method includes electronically providing different rates to different customers, by the at least one computer implementing the global transfers computer application, based on global proposition. In some embodiments, the method includes applying, by the at least one computer implementing the global transfers computer application, a globally consistent default spread for each proposition.

In some embodiments, the method includes performing a linking validation, by the at least one computer implementing the global customer data computer application, confirming that the first and second accounts are associated with the same person, and that the first and second accounts are electronically linked.

In some embodiments, the method includes electronically connecting, by the at least one computer implementing the global transfers computer application, to the at least one computer implementing the global customer data computer application, for a transfer authorization electronically retrieving the linking validation result, and electronically retrieving global compliance screening information for the customer from the central customer database.

In some embodiments, the method includes, when at least one of the first and second accounts has one or more joint parties for whom there is no global compliance screening information in the central customer database, electronically connecting, by the at least one computer implementing the global transfers computer application, with a third party system for real time global compliance screening for the joint parties.

In some embodiments, the method includes receiving, by the user interface, electronic global transfer instructions from the customer, wherein the global transfer instructions comprise electronic instructions to perform at least one of an immediate transfer, a future transfer, a recurring transfer, and a transfer history search.

In some embodiments, the method includes providing administrative functionality for staff users, by the at least one computer implementing the global transfers computer application, via at least one of a computerized customer service representative component and a computerized reconciliation component.

In some embodiments, the method includes performing, by the at least one computer implementing the global transfers computer application, automated distribution of FX income to the different entities.

In some embodiments, the method includes electronically receiving, by the at least one computer implementing the global transfers computer application, transaction summaries from a plurality of operational and settlement accounts.

In some embodiments, the method includes generating, by the at least one computer implementing the global transfers computer application, one or more FX income reports reporting FX income by proposition.

In some embodiments, the method includes using an electronic request for quote (RFQ) to obtain the FX rates for unsupported currencies, by at least one computer implementing a Foreign Exchange Manager (FXM) computer application, and using accumulation to apply streamed FX rates for supported currencies, by at least one computer implementing a Foreign Exchange Accumulator (FXA) computer application.

DETAILED DESCRIPTION

Figure 1:
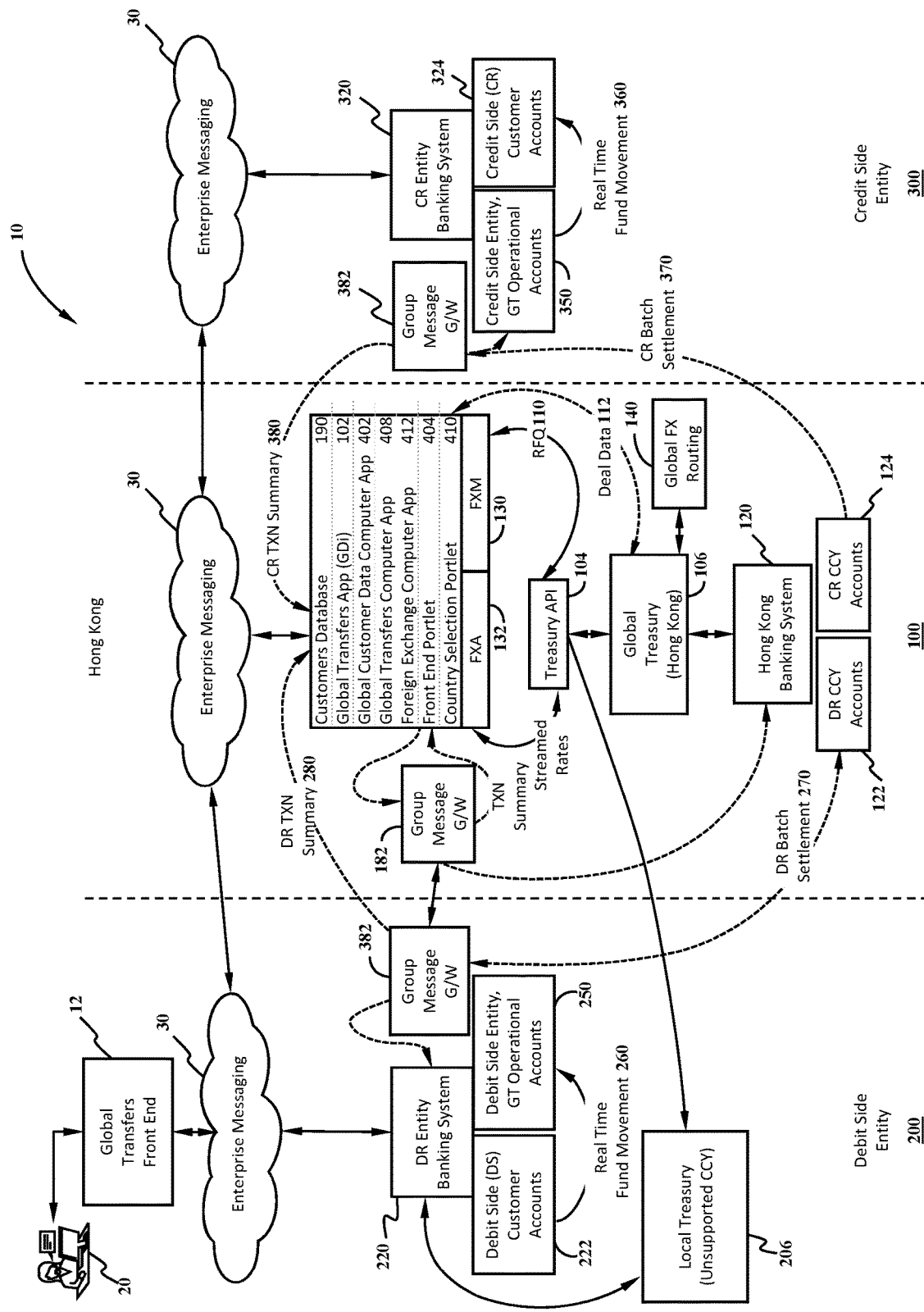
FIG. 1 is a diagram of an exemplary architecture for a Global Transfers computer system according to some embodiments of the invention.

The present invention relates to improved systems and methods for transfers and/or currency exchanges. In some embodiments, the invention allows customers who have relationships with more than one entity of a bank around the world (e.g., are registered internet banking users having accounts with the Bank in more than one country) to advantageously link their personal internet banking system (PIB) profiles from the various entities together. Customers can thereby authenticate to one PIB and then perform single sign on (SSO) to other linked profiles from other entities, for example, for customer accounts in different countries. In what is referred to herein as "Global View" (GV), customers optionally have an aggregated view of all their accounts from all linked PIBs in each PIB, and the view is consistent in each. The PIB profiles are preferably stored in a central reference data store maintaining customer specific information, such as a Global Customer Data Utility (GCDU) as described herein. GCDU receives data feed from entities and stores the data centrally for retrieval. In some embodiments, customer data are stored in a distributed manner.

In some embodiments, the invention provides customers with "Global Transfer" (GT) capabilities, enabling customers to transfer funds between their accounts internationally. Such Global Transfers are also referred to herein as "Me2Me" (M2M) transfers, as they are transfers between accounts held by the same person and optionally associated with PIB profiles that have been linked using Global View. Global Transfers include, for example, FX transactions, which involve foreign exchange (e.g., debit GBP and credit USD), and/or non-FX transactions, which do not involve foreign exchange (e.g., debit GBP and credit GBP). Real time, preferential FX rates are preferably applied to all FX transactions, for supported and/or unsupported currencies.

In some embodiments, a currency is considered supported if a Global Treasury 106 (e.g., Hong Kong) can provide a guaranteed FX rate and the banking system 120 connected to the Global Treasury has accounts established to make and receive payments in that currency. In various embodiments, supported currencies may include, but are not limited to, one or more of the following standard currencies: AED, AUD, BHD, CAD, CHF, CZK, DKK, EUR, GBP, HKD, JPY, KWD, KYD, MXN, NOK, NZD, PLN, SAR, SEK, SGD, USD, ZAR. In some embodiments, real time rates for supported currencies provided by the present invention are more efficient and/or cost effective than those previously available, because a request for quote model is optionally used, making a single deal per transaction possible.

A currency may be considered unsupported for various reasons, such as no liquidity/insufficient demand for trading, local regulation/currency control, etc. In various embodiments, unsupported currencies may include, but are not limited to, one or more of the following: (1) currencies that the Global Treasury has no liquidity for (e.g., BMD, BND, EGP, JOD, LBP, LKR, OMR, PKR, PYG, QAR); (2) currencies tradable only onshore in that country (e.g., IDR, INR, MYR, PHP, VND); (3) currencies unsupported due to local regulation (e.g., THB); and/or (4) currencies for which the government provides the final rate (e.g., BRL). In some embodiments, real time rates for unsupported currencies were not previously available, and the present invention enables them to be provided.

Supported and unsupported currencies are not limited to the above-described characteristics. In alternative embodiments, other criteria may be used in addition to or instead of those described above for determining whether a currency is considered supported or unsupported by a certain treasury. In addition, the criteria may change over time. In alternative embodiments, supported currencies are currencies managed and/or converted by a global treasury or other treasury that allows such currency to be considered supported, whereas unsupported currencies are dealt directly, managed and/or converted by a local treasury.

FIG. 1 is a diagram of an exemplary architecture for a Global Transfers computer system 10 according to some embodiments of the invention.

From a Global Transfers front end 12, customers 20 can, for example, log in to an entity PM system and create, change, and/or delete instructions to transfer funds between debit side (DR) customer accounts 222 and credit side (CR) customer accounts 324 held in different entities (including the debit side entity 200 and the credit side entity 300) by the same customer 20, and/or request a history of transfer transactions. As described in further detail below in connection with the screenshots, in some embodiments, this functionality involves sending messages through an Enterprise Application Interface (EAI) to a Global Transfers application 102, for example using Enterprise Messaging 30.

In some embodiments, the invention utilizes a Global Transfers application 102 such as the standard Global Direct (GDi). GDi 102 is a commercially available payment warehouse that can connect to a primary Global Treasury 106

(e.g., Hong Kong) and/or a Local Treasury 206 as needed via a Treasury Application Programming Interface (TAPI) 104. In various embodiments, GDi 102 provides one or more of the following functions: accept payment instructions from different channels (customer facing and staff facing); query, book, and finalize discount foreign exchange deals 112 with the Global Treasury 106; initiate payment instructions to source and destination entities to support cross-border transfers; maintain the history of cross-border transfers; provide email notification to customers on scheduled transfer failures; and/or communicate with GCDU 402 to retrieve Linking Validation (LV) status and Security Compliance Data Matching (SCDM) scanning status of a customer.

In some embodiments, GCDU 402 may perform an automated Linking Validation (also referred to as Same Person Validation), to verify that the PIB profiles of the debit side (DR) customer accounts 222 and credit side (CR) customer accounts 324 that the customer is transferring between belong to the same person. The Linking Validation may analyze, for example: Front End (FE) and Customer Service Representative (CSR) updates to SSO, SSO linking notification to GCDU, GCDU customer information retrieval from entity banking system (including DR entity banking system 220 and CR entity banking system 320) and/or same person validation using Global Name Recognition (GNR).

In some embodiments, GDi 102 may call GCDU 402 to perform a Transfer Authorization (TA), retrieving the same person Linking Validation result as well as any SCDM scanning results stored in the GCDU database for the customer. SCDM provides a real time watchlist scanning capability to GDi 102, to perform a global compliance check on the customer using one or more resources such as the U.S. Office of Foreign Assets Control (OFAC) watch list. For joint accounts in which information for one or more of the account holders is not present in GCDU 402 for an authorization check, GDi 102 may interface with SCDM to perform a real time check for those joint parties. GCDU and SCDM are accessible to the Front End and GDi 102, for example, using Enterprise Messaging 30 via an EAI, or network of EAIs.

In some embodiments, the invention utilizes a group standard application such as Foreign Exchange Manager (FXM) 130 to get rates for FX transactions. In some embodiments, FXM 130 optionally leverages a Request for Quote (RFQ) 110 model, in which all transactions are RFQ based. Each transaction has a single deal, which is direct between the pair of currencies (no double deal, e.g., using an intermediary currency such as USD). Responsive to the FXM RFQ, the TAPI 104 gets risk margins, market rates, rate margins, netting, and/or income management information from the Treasury 106 (e.g., generated by a liquidity engine). Supported currencies are dealt with a Global Treasury 106 (e.g., Hong Kong). Unsupported currencies are dealt directly with a Local Treasury 206. Sales margin may be determined, for example, either by the Treasury 106, or in FXM 130, or in GDi 102. In some embodiments, different sales margins may be set, for example, by country and/or currency pair, and/or other predetermined criteria. Sales margin/spread can be applied manually through designated personnel, automatically through a software application, or semi-automatically through a computer and/or human intervention.

In some embodiments, FXM 130 is configured with a contingency mechanism to deal with outages (e.g., a Treasury 106/TAPI 104 may be turned off, a specific currency pair may be disabled due to market volatility or the need to manually update rates, etc.). As rates are being requested, the system periodically caches the rates for all the currency pairs and stores them in FXM 130. If an outage occurs, transfers during the outage may be made using the FX rates stored in FXM 130, not live Treasury rates. In some embodiments, cached rates may be used on weekends as well, optionally adjusted responsive to automated and/or manual analysis of rate trends to assess risk.

In some embodiments, using the RFQ 110 model via FXM 130 provides better, more efficient, more cost effective and/or more accurate rates as compared to what was previously available. For example, when using an application such as Foreign Exchange Accumulator (FXA) 132 to get FX rates, an individual trade is not made for each transaction; rather, the system aggregates customer currency transfers and books deals with the Global Treasury when a predetermined number of transactions have been processed (e.g., about every 15 minutes), using streamed rates that the Global Treasury 106 pushes to the system. In contrast, no accumulation is necessary using the FXM 130 RFQ 110 model according to some embodiments of the invention; the system makes a separate rate request for each transaction, and can create and/or establish a single deal per transaction. Unlike FXA, which streams rates that are typically refreshed about every five minutes, wait times for deals can be significantly shorter using the FXM 130 RFQ 110 model. In addition, unlike FXA, which can only connect to the Global Treasury (and, thus, can only get live rates for currencies supported by the Global Treasury), FXM 130 can connect to Local Treasuries 206 to get real time FX rates for currencies that are not supported by the Global Treasury 106.

In various alternative embodiments, the FXM 130 RFQ 110 model is used as described above for unsupported currencies, but different options may be used for supported currencies. For example, in one alternative option for supported currencies, the bucket and accumulation features of FXA 132 are moved to FXM 130 and streaming of rates occurs for each currency pair bucket. The transactions accumulated have a single deal per bucket (though the deal ID mapping is individual per transaction). In another alternative option for supported currencies, FXA 132 (implementing bucket and accumulation features) is used for supported currencies, while the FXM 130 RFQ model is used for unsupported currencies, with no changes to FXA 132 or FXM 130. Sales margin is applied in FXA 132 for supported currencies, and in Treasury for unsupported currencies. Other approaches for obtaining rates for supported and/or unsupported currencies, using FXM 130, FXA 132, and/or other applications/methods, may be used.

In some embodiments, FXA 132 is not used for Global Transfers, but provides other capabilities to GDi 102. For example, in some embodiments, FXA 132 is used for FX order watches. Customers can set up a standing instruction to watch one or more currency pairs and make a deal when a certain threshold is reached. For example, if the USD against GBP rises to a predetermined number or falls to a predetermined number, then buy/sell the currency per the instruction.

In some embodiments, real time rates are available 24 hours a day 5.5 days a week via Global FX Routing 140. For example, in some embodiments, Hong Kong is used as the Global Treasury 106. When the market in Hong Kong is not open, another designated treasury may serve as the Global Treasury. For example, before Hong Kong opens, Australia/New Zealand may be used, and after Hong Kong closes, UK may be used, then US, then Australia/New Zealand again. Thus, for example, a deal may be booked in Hong Kong, but have an FX rate from the US Treasury guaranteed by a New York entity. In some embodiments, FXM 130 may store FX rates for use within a predetermined period of time. For example, a customer initiates a transfer at 5 pm EST, at which time FX rates are requested and stored in FXM 130. If the customer returns at 7 pm, in some embodiments, the FX rates used will be those stored in FXM 130, not from the Treasury.

In some embodiments, the customer experience for unsupported currencies is closely aligned to the supported currency experience. For example, even where regulations require countries to use the Local Treasury 206 for FX transfers, the FX rate displayed to the customer on the review and confirm pages should be consistent. The rate displayed is the actual FX rate applied to the transaction if the customer chooses to continue, not an indicative rate. The rate applied is preferably retrieved automatically from the Treasury 106 via the TAPI 104, with no manual intervention needed to update the rates.

In alternative embodiments, indicative rates (which may have wider spreads than real time rates) may still be used (e.g., where markets are closed and no alternative is available), but may be more efficient, more cost effective, and/or more consistent with final rates, as compared to what was previously available. In some embodiments, instead of each entity setting their own indicative rates, a multi base currency mechanism is used as follows. Each entity configures and maintains indicative FX rates for all the base currencies that they support, for example, in a centralized GDi table. These indicative FX rates are shown on the review page. The system will get the specified indicative pair if the supported currency in the pair is part of the multi base currency configuration. Where a pair is unsupported to unsupported, a default base currency will be applied (e.g., USD).

For example: a transfer between INR and GBP, where the entity has USD, CAD, and GBP as base currencies. If the entity has USD, CAD, and GBP as base currencies, and the unsupported currency is INR, the following pairs should be entered in the multi base currency configuration (e.g., using a GDi CSR Tool): USD-INR, INR-USD, CAD-INR, INR-CAD, GBP-INR, INR-GBP. As the credit currency is GBP, which is in the multi base currency configuration, GDi gets the indicative rate pair INR-GBP from the table. If there is no corresponding pair in the table (e.g., pair is missing), GDi will use USD as the default base currency.

In some embodiments, when markets are closed or an entity bank is not available, that entity cannot be used in the transfer. The customer may be advised, for example, that the transfer will be made at a later time (e.g., next day trade). In some embodiments, weekend transfers are stored in FXM 130, and cleared when the first market opens.

In some embodiments, the invention provides the ability to use different FX rates and/or fees for different customers (segmented pricing), on an ongoing basis or for a limited period. Customers and/or transactions may be differentiated, for example, based on the customer proposition (group with specified benefits/privileges, e.g., standard Premier, Advance or Retail as offered commercially by HSBC and/or other criteria that may optionally be used), the customer's tier (e.g., free for high value customers, a fee for lower value customers), the transfer amount (e.g., under/over US$50K), the volume of use (e.g., greater/less than 10 transactions per month), and/or other predetermined criteria. In some embodiments, the rates/spreads to be applied and the parameters for driving the rates (value, volume, etc.) are globally consistent. In some embodiments, segmented pricing may be used during the week, and a single sales margin (which does not vary by customer/transaction characteristic(s), but in some embodiments may vary by country) will be used during the weekend.

In some embodiments, segmented pricing is utilized by changing the spread depending on the customer proposition. For example, Premier customers may be provided with a better exchange rate (smaller spread) as compared to Advance customers (larger spread). In some embodiments, the spread to apply may be based on the customer's Global Proposition (e.g., if the customer's Global Proposition is Premier, even if they are making a transfer between Advance/Retail accounts, the Premier spread will apply). Preferably, there is a globally consistent spread for each proposition across entities. To support this feature, a global default spread for each proposition may be established for all entities, which is managed centrally (either manually or through an algorithm) to ensure consistency. However, there is flexibility in the system to enable spreads to be defined by country if desired. The spread is preferably common across all currencies supported by that entity. Two propositions (Premier and Advance) are described in this example; however, any number of other propositions may be supported.

Various methods of determining and/or offering FX rates differentiated by proposition may be used. One exemplary process to offer FX rates differentiated by proposition is as follows. GDi maps entity and proposition to a Tier ID. Tier ID is used to access the spreads (e.g., in FXA). An additional message may be used to retrieve Global Proposition from GCDU. When GDi receives the ProvideTransferInstruction, it will send a new message to GCDU (Transfer Authorization 3) receiving the Same Person Validation status, and the Global Proposition. If the Same Person Validation status is false (the relationship is unknown), GDi returns the error back to the front end. If the Same Person Validation status is true, GDi will compute the Tier ID based on the debit entity and Global Proposition.

For example:
Debit Entity: Canada
Canada Premier tier ID: 1
Canada Advance tier ID: 2
Customer A Global Proposition: Premier
Customer B Global Proposition: Advance For Customer A, GDi will send the tier ID=1 to FXA. FXA returns the rate applying the Canada Premier spread. For Customer B, GDi will send the tier ID=2 to FXA. FXA returns the rate applying the Canada Advance spread. In some embodiments, for cases where a Global Proposition cannot be identified, the Premier tier is used. On the due date for future-dated or recurring transfers, the same logic is applied (get the Same Person Validation status, and Global Proposition; check the Same Person Validation status; compute the Tier ID; get the rate from FXA). If the Validate messages (debit and credit) return any associated customer, the TA message will be sent to GCDU again for the joint parties.

In some embodiments, FX income for transfers using supporting currencies is calculated and/or reported by remitting entity, as the FX income belongs to the debit account holding entity. Preferably, FX income distribution (e.g., monthly payments to entities) is automated (e.g., through GDi), and the system is configured to store and maintain payment details (accounts, credit currency, specific payment details, etc.). In some embodiments, automated email notices of FX income payments are sent (e.g., monthly), and the system is configured to store and maintain contact details.

In some embodiments, the invention provides the ability to create or modify a report of income that can be attributed to foreign exchange transactions, by proposition and/or sub-segment. For example, the report can provide information on the foreign exchange income that can be attributed to Premier, Advance, and sub-segment as a result of Global Transfers at the country, region, and global level. A transaction table stores each completed transaction, and has the Global Proposition as one of the fields. A batch to create the reports can separate the transactions based on proposition. In some embodiments, the GDi CSR provides two reports regarding FX income for Global Transfer transactions, with report fields as summarized in Tables 1 and 2 below.

TABLE 1

Report Fields - FX Profit Analysis Summary Report

| Field Name | Description |
| --- | --- |
| Sending Entity | Debit entity (3 char country code) |
| Premier USD FX Markup | Total of Premier FX Income made. Amount in USD. |
| Advance USD FX Markup | Total of Advance FX Income made. Amount in USD. |
| Total USD FX Markup | Sum of Premier USD FX Markup and Advance USD FX Markup |
| Number of Premier Transactions | Premier transactions |
| Number of Advance Transactions | Advance transactions |
| Total Number of transactions | Sum of Number of Premier Transactions and Number of Advance Transactions |

TABLE 2

Report Fields - FX Profit Analysis Detail Report

| Field Name | Description |
| --- | --- |
| Sending Entity | Debit entity (3 char country code) |
| Receiving Entity | Credit entity (3 char country code) |
| Premier USD FX Markup | Total of Premier FX Income made. Amount in USD. |
| Advance USD FX Markup | Total of Advance FX Income made. Amount in USD. |
| Total USD FX Markup | Sum of Premier USD FX Markup and Advance USD FX Markup |
| Number of Premier Transactions | Premier transactions |
| Number of Advance Transactions | Advance transactions |
| Total Number of transactions | Sum of Number of Premier Transactions and Number of Advance Transactions |

FIGS. 2-10 show exemplary customer facing screen shots for Global Transfers, according to some embodiments of the invention. Front End (F/E or FE) application portlets are provided to entities for integration into their local PIB to provide a global consistent look and feel. Externalized content and configuration on the FE can provide for any local variations (e.g., language translations).

Figure 2:
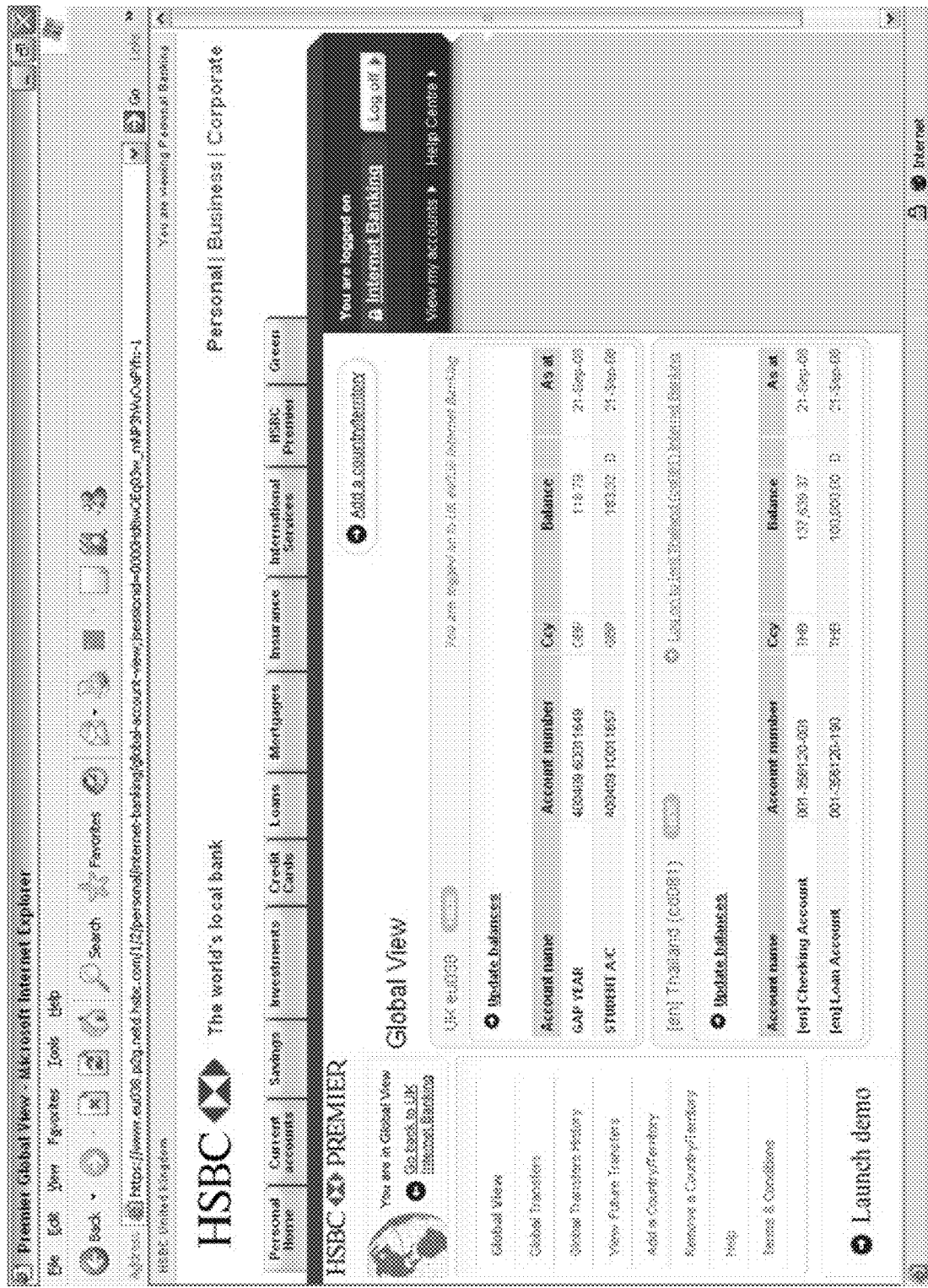
FIG. 2 shows an exemplary Global View page, according to some embodiments.

FIG. 2 shows an exemplary Global View landing page. In addition to being able to create/change/delete instructions to transfer funds between their accounts held in different entities, customers can, for example, schedule future dated and recurring transfers, and request a history of transfer transactions.

Figure 3:
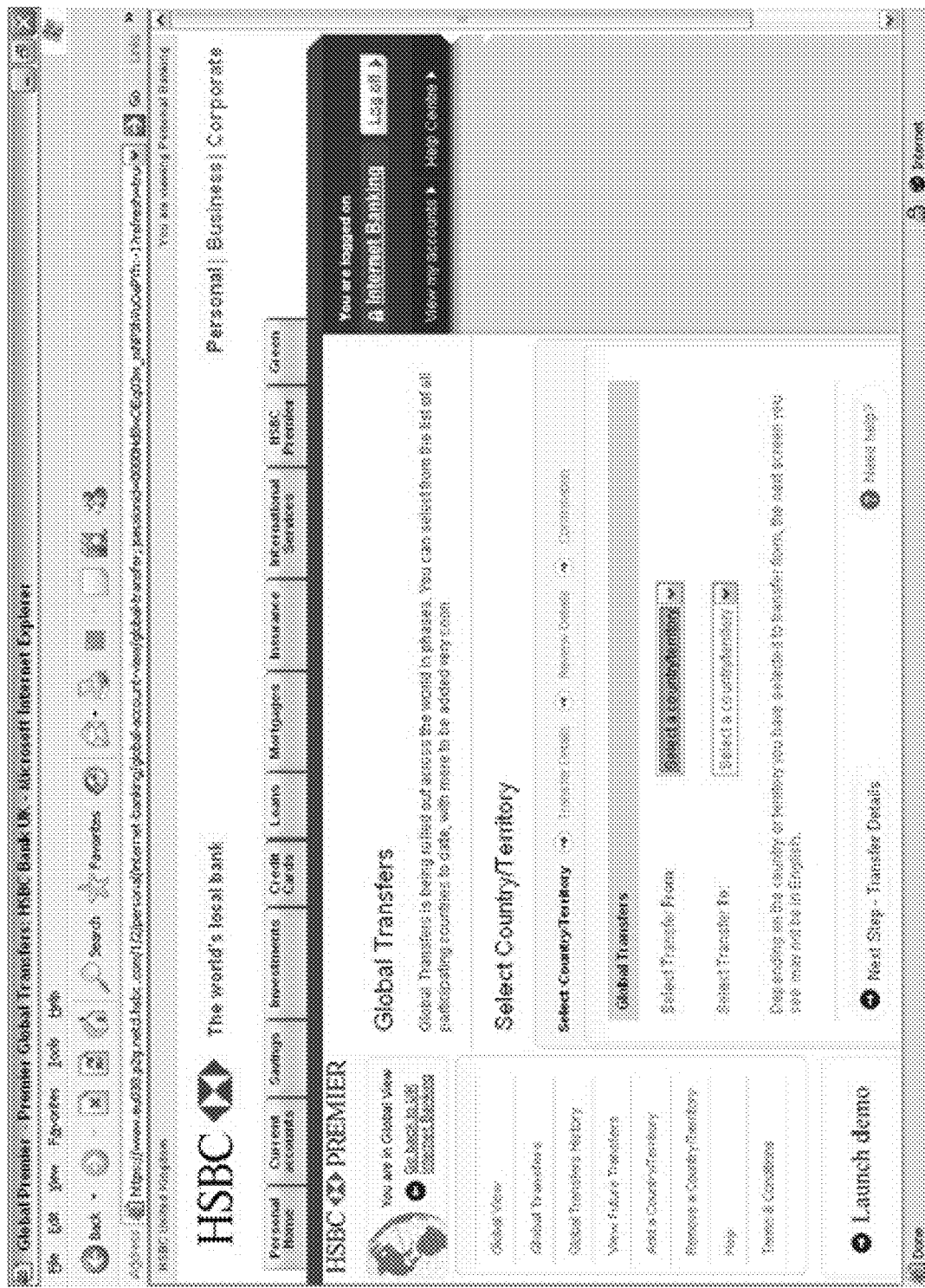
FIG. 3 shows an exemplary Country Selection screen, according to some embodiments.

FIG. 3 shows an exemplary Country Selection screen. When the customer selects the Global Transfers option on the Global View page, a Country Selection screen is presented. The country selection portlet 410 retrieves a list of customer-linked profiles from a regional SSO server, and then displays the countries that the customer has linked and are available for global transfers (e.g., in a dropdown menu). The customer selects the country they want to transfer money From and To from the dropdowns. The country selection portlet 410 will then send a message to GDi 102 via EAI to ensure that the two countries are transactable, and receive a result as to whether the customer can proceed with the transfer. Clicking "Next Step" will direct the customer to a Transfer Details screen. Preferably, the transfer is made from the debiting entity, so if this is not the PIB that the customer is logged on to, clicking "Next Step" may redirect them to the PIB they are transferring from. This may be done using SSO, so there is no need for the country to re-authenticate.

Figure 4:
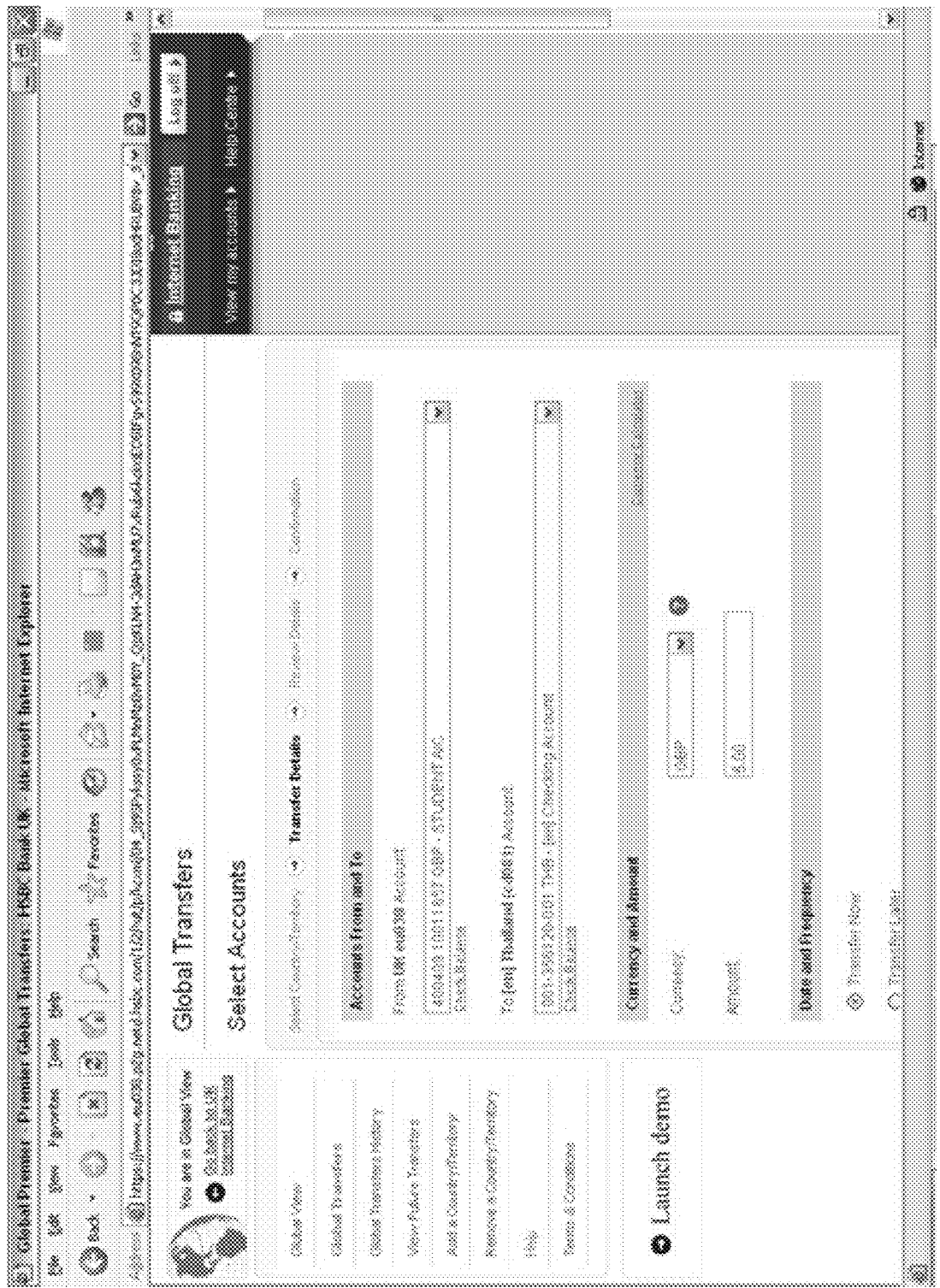
FIG. 4 shows an exemplary Transfer Details screen, according to some embodiments.

FIG. 4 shows an exemplary Transfer Details screen. Messages are sent from the front end to the Debiting (Dr) Entity Banking System/Back Office System (BOS) and Crediting (Cr) Entity BOS before displaying the Transfer Details screen to retrieve a list of accounts that the customer can select for the Global Transfer. The transfer portlet/106 will populate the account lists. The front end then sends a message to GDi for fields that can be pre-populated into the Transfer Details page. These fields may include, for example, email address, email contact preference, and/or any entity-specific fields (e.g., reason for transfer) submitted by the customer in previous transactions. After collecting the information, the transfer portlet will present the Transfer Details page to the customer for transfer details entry. The customer selects the accounts they want to transfer From and To, the Currency, Amount, and whether they want to do an immediate or future-dated transfer. Some countries may also require a Reason for Transfer; if so, a dropdown box with the appropriate data may be provided.

Figure 5:
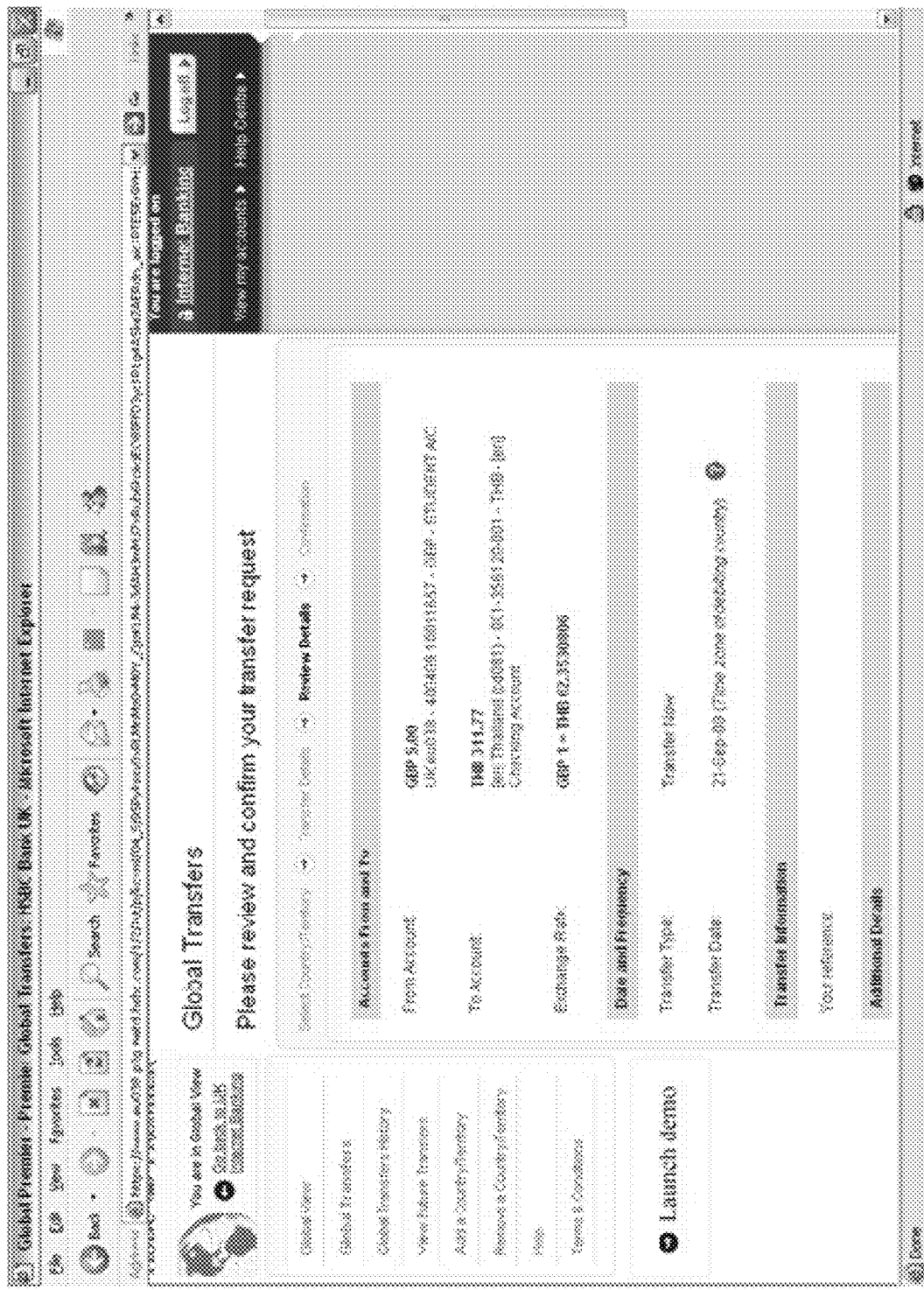
FIG. 5 shows an exemplary Review Details screen, according to some embodiments.

FIG. 5 shows an exemplary Review Details screen. Once the customer has entered and submitted the transfer details, the transfer portlet will send a message containing the transfer instruction to GDi. On receipt of the transfer request, GDi will send messages to the Debiting Entity BOS and Crediting Entity BOS to perform transfer pre-transaction validation. The message may be sent as a bundled message from GDi to EAI. GDi will send a Transfer Authorization message to GCDU to retrieve the transfer validation status of the transacting customer and associated parties to the account. When GCDU does not contain the transfer validation status of the requested parties, GDi will send a message to SCDM to perform real time scanning against these profiles. Based on the returned SCDM result, GDi will determine whether the transaction should proceed. If so, the customer is directed to the Review Details page to review the transfer details before confirming. An exchange rate (for FX transfers) and any error messages are included on the Review Details page.

Figure 6:
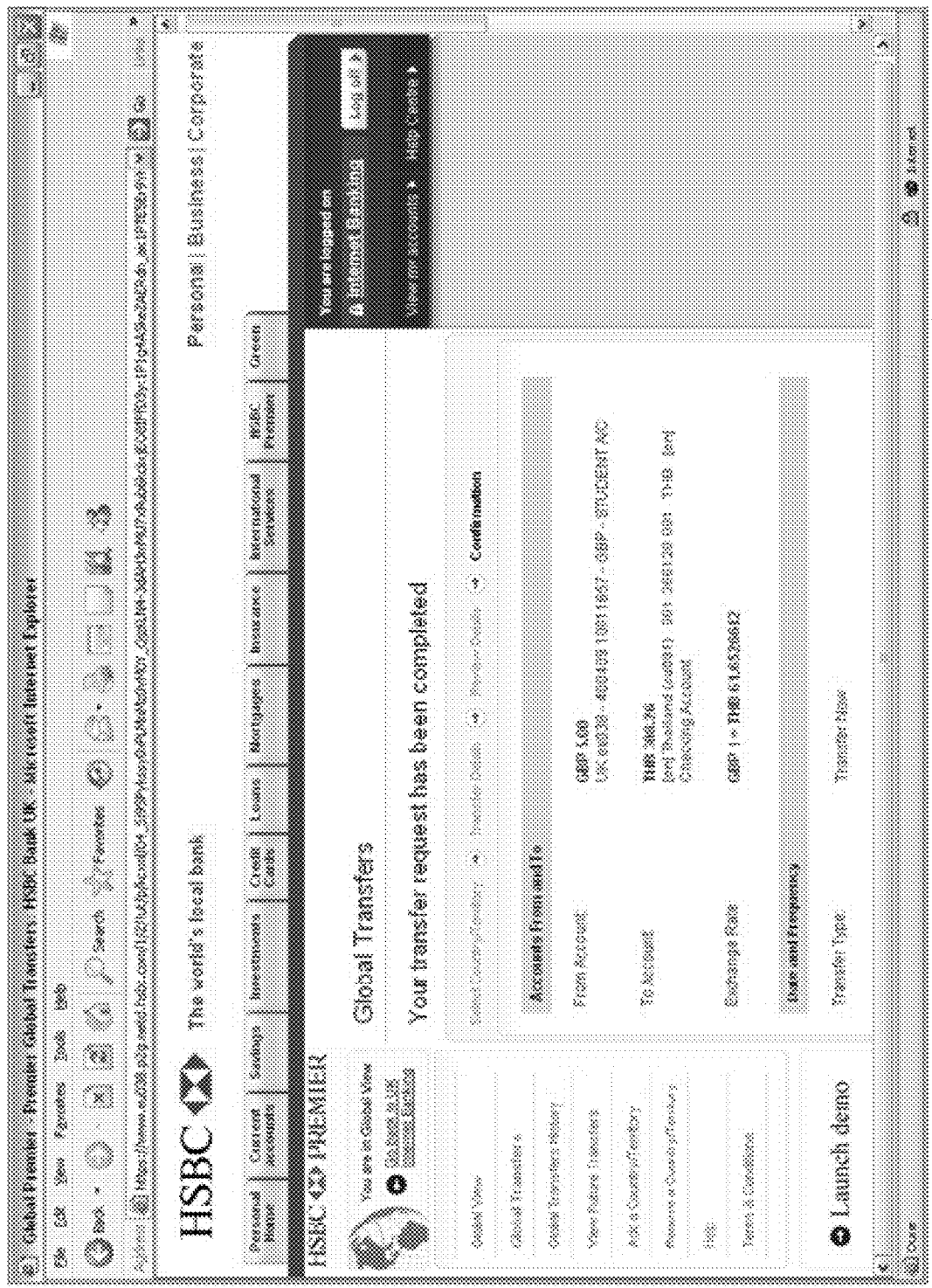
FIG. 6 shows an exemplary Confirmation page, according to some embodiments.

FIG. 6 shows an exemplary Confirmation page. Once the customer confirms the details of the transfer, the transfer portlet will send a message to GDi via EAI to complete the transfer. For immediate transfers, GDi will execute the transfer, and the customer is presented with the Confirmation page. For future-dated or recurring transfers, GDi will capture the instruction and present acknowledgement details. For transfer processing, GDi will send a message to the Debiting Entity BOS to execute a transaction that debits the Customer Account and credits the entity's Operational Account. On successful debit, GDi will send a second message to the Crediting Entity BOS to execute a transaction that debits the entity's Operational Account and credits the Customer Account.

Figure 7:
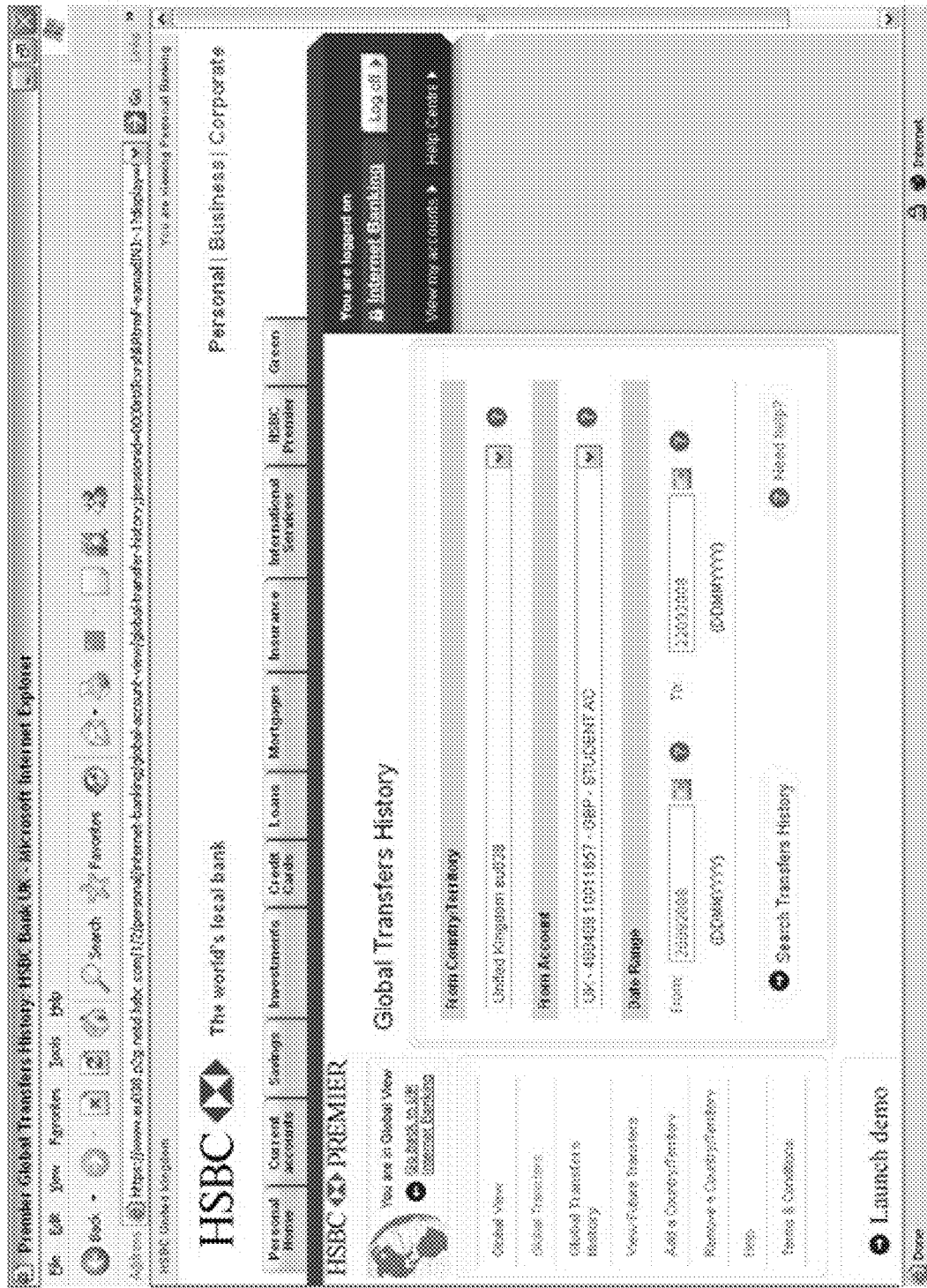
FIG. 7 shows an exemplary Global Transfers History page, according to some embodiments.
Figure 8:
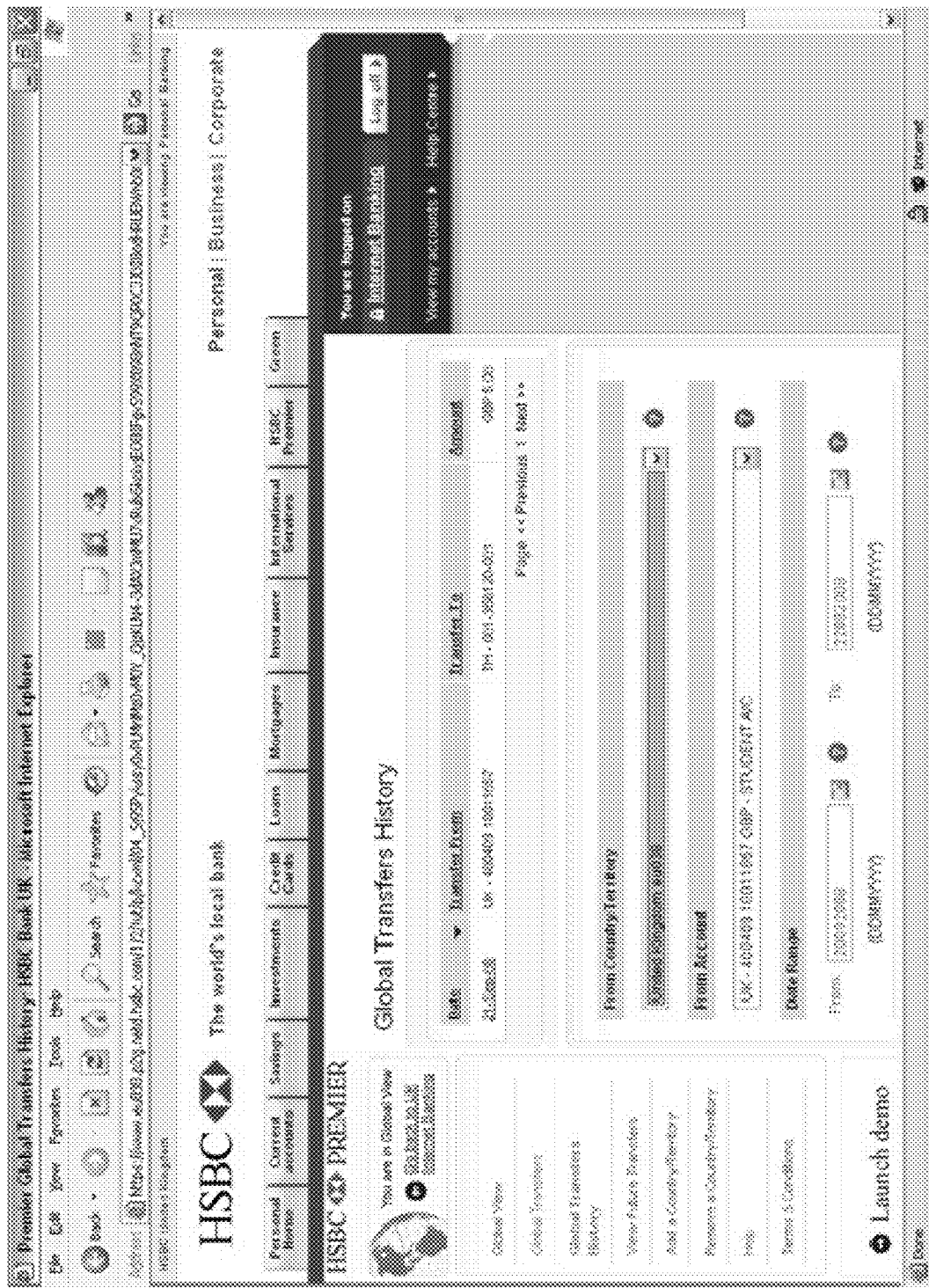
FIG. 8 shows an exemplary Global Transfers History page with a list of transfers that meet selected criteria.
Figure 9:
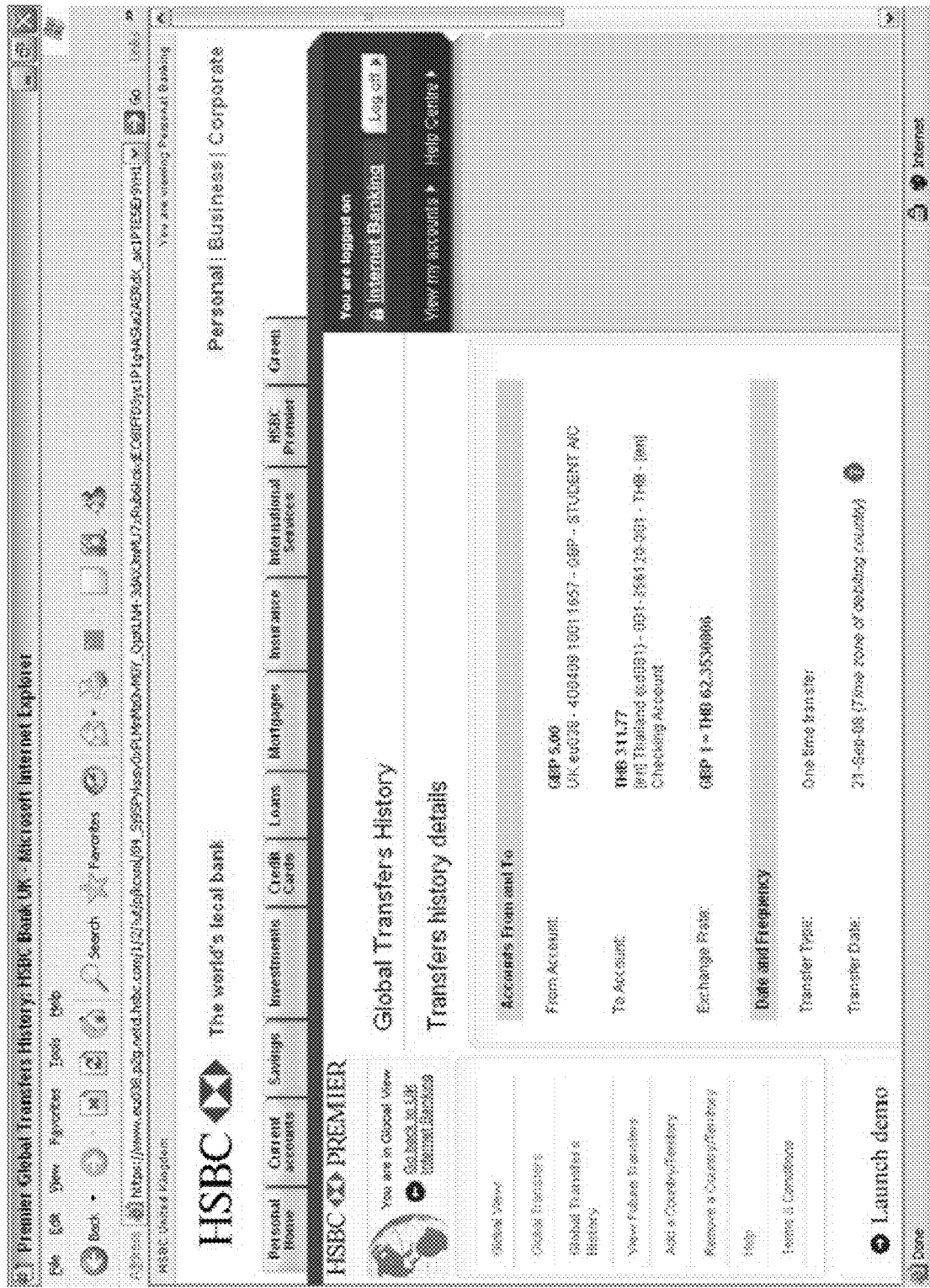
FIG. 9 shows an exemplary Global Transfers History page with details of a selected transfer.

FIG. 7 shows an exemplary Global Transfers History page. When the customer selects this option from the Global View page, the front end sends a request to regional SSO to get linked identities, and then displays the countries that the customer has linked and are available for global transfers (e.g., in a dropdown menu). It also sends a message to each of the BOS to get a list of accounts to display in the dropdown. The customer chooses the transfers he/she wants to search for, for example by specifying the From Country/Territory, From Account, and Date Range. When the customer selects "Search Transfers History" a message is sent to GDi to retrieve the transfer list and the customer is presented with a list of transfers that meet the criteria selected, as shown, for example, in FIG. 8. The customer can click on each of these transfers to obtain more details of the transfer. If the customer clicks on one of the transfers on the list a message is sent to GDi to retrieve more details about the transfer, and the details are presented to the customer, as shown, for example, in FIG. 9.

Figure 10:
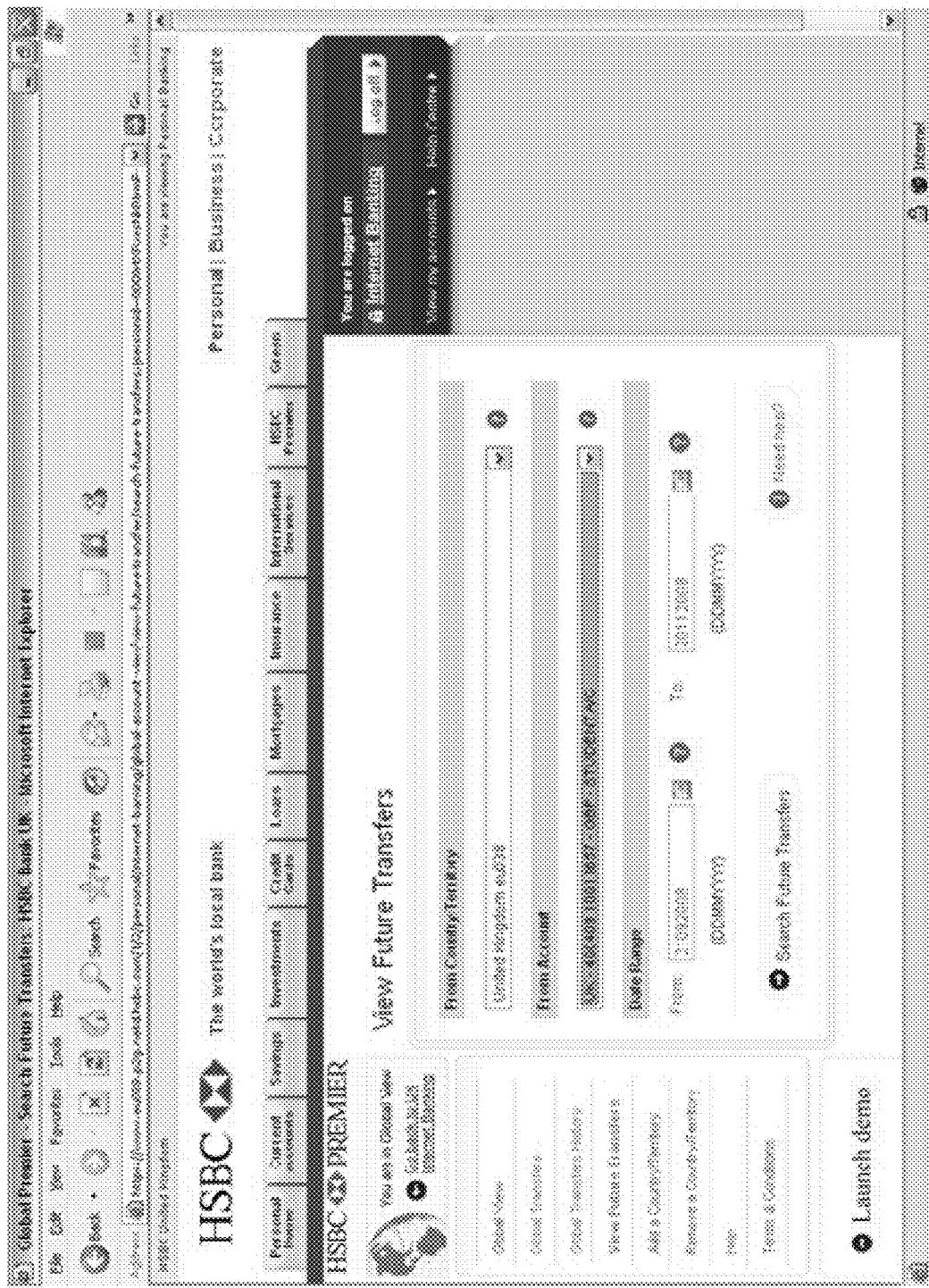
FIG. 10 shows an exemplary View Future Transfers page, according to some embodiments.

FIG. 10 shows an exemplary View Future Transfers page. When the customer selects this option from the Global View page, similar to Transfer History, the front end sends a request to regional SSO to get linked identities, and then displays the countries that the customer has linked and are available for global transfers (e.g., in a dropdown menu). It also sends a message to each of the BOS to get a list of accounts to display in the dropdown. The customer chooses the transfers he/she wants to search for, for example by specifying the From Country/Territory, From Account, and Date Range. When the customer selects "Search Future Transfers" a message is sent to GDi to retrieve the transfer list and the customer is presented with a list of transfers that meet the criteria selected. The customer can click on each of these transfers to obtain more details of the transfer.

Future dated or recurring transfer instructions can also be updated. The front end portlet 404 will send a message to GDi 102, which will capture the amended instruction, validate the details, and return the details to the portlet for the customer to review. When the customer confirms the changes, the front end portlet 404 will send a message to GDi 102 to proceed with the changes, and an acknowledgement will be returned the customer that GDi has applied the changes. For cancellations, the customer selects a future dated or recurring transfer and submits. The front end portlet will send a message to GDi, which will remove the selected future transfer instruction from its scheduler. Results of the cancel operation will be returned to the portlet for acknowledgement to the customer.

In some embodiments, an FX calculator page may be provided. The front end portlet will send a message to GDi to request a list of currencies that the customer can select for foreign exchange rate calculation, and the retrieved currency list will be populated into From and To currency lists accordingly. One the customer has selected the currencies and the amount to be converted, the portlet will send a message to GDi to calculate a conversion amount. The result will be returned the portlet and displayed to the customer.

GDi may also provide a variety of staff facing functions. For example, in some embodiments, GDi has a CSR Tool that provides customer service representatives or other designated personnel the functionality to view, amend, and/or delete a customer transfer in the GDi system. The CSR Tool may also allow staff to specify currency cut-off periods, holidays, and/or maintenance periods for their respective entities, during which GDi may not enact transfers. The CSR Tool may also allow staff to maintain business rules, for example: a global daily limit rule (setting a predetermined transfer limit value per customer per day), a per customer limit rule (less than or equal to the global daily limit), entity level limit rules (setting a predetermined limit on volume and/or amount of transfers per a predetermined time period), a per transaction limit rule (set at the entity level; any single transfer from that entity cannot exceed this limit), a duplicate check rule (performing a check for duplicate transfer instructions within a predetermined time frame, e.g., 24 hours, 3 minutes, etc.), a maximum payment account limit rule, a number of senders per account limit rule, etc. Due to local government regulations in different entities, other local limits may be applicable (e.g., total inbound transactional limit of USD9000 per month in Brazil).

In some embodiments, another staff facing application (e.g., eCare) provides customer service representatives or other personnel the functionality to administer customer profiles and perform profile linking and/or de-linking for a customer. Outstanding scheduled transfers may be displayed during the profile de-linking process.

From the customer perspective, Global Transfers are real time, or near real time, as the accounts are debited and credited immediately, similar to domestic PIB transfers. In some embodiments, for real time debiting and crediting of customer accounts for Global Transfers, operational accounts (suspense accounts) are established in each entity for each currency that the entity offers the real time debiting and crediting service. These accounts are labeled in FIG. 1 as "Debit Side Entity, GT Operational Accounts" 250 and "Credit Side Entity, GT Operational Accounts" 350 of the Debiting (Dr) Entity and Crediting (Cr) Entity, respectively. The debit side entity, GT operational accounts 250 and credit side entity, GT operational accounts 350 accept real time debit and credit postings where the contra posting is to a customer account. For example, when a customer confirms a transaction, there is a real time debit from the customer's account with the Dr Entity to a Dr Entity Operational Account, and a corresponding real time credit to the customer's account with the Cr Entity from a Cr Entity Operational Account (these steps are labeled 1 and 2 in FIGS. 11-19, discussed further below). In some embodiments, the credit portion will not be initiated until confirmation has been received from the sending entity that the customer's account has been debited. Preferably, there is no limit on the value, volume, or frequency of the real time or online postings. The operational accounts may have an intra-day debit balance without any manual intervention to approve postings. In addition, debit and credit currency accounts (settlement accounts) are established (one per currency) in the Global Treasury country (e.g., Hong Kong). These accounts are labeled in FIG. 1 as "Dr CCY Accounts" 122 and "Cr CCY Accounts," 124 and are not entity specific. In some embodiments, for Treasury Settlement, the debit and credit currency accounts are debited and credited by the Global Treasury on a deal level. In some embodiments, the Treasury Settlement may be a batch settlement containing all the transactions since the previous settlement.

The debit and credit currency accounts may also be used to make/receive payments to/from the entity operational accounts for settlement. In some embodiments, transferred funds do not move internationally during the transfer itself; settlement of the debit and credit entity operational accounts is initiated by GDi at a predetermined later time (e.g., at the end of the entity's day). Settlement is preferably per currency, per entity, and is a batch settlement containing all the transactions since the previous settlement. Settlement may be via inbound or outbound bulk or batch wire payment (e.g., MT103 or MT103+, which are standard message types established by the Society for Worldwide Interbank Financial Telecommunication (SWIFT) to make payments to a bank/entity in another country). In some embodiments, payments are supported by straight-through processing (STP). Payments are preferably made on the same business day as the real time postings; however, as wire rooms typically close before the end of the entity's business day, there may be an overnight balance. In some cases, due to time differences, inbound payments to clear a debit balance on an operational account may not be received until the next business day.

FIGS. 11-19 show exemplary Accounting Business Flows for different types of Global Transfers. Cross-border transfers can be made from to/from a local or a foreign currency. As used herein, local currency (LCY) means that the currency of the account is the legal tender of the country in which it is domiciled (e.g., a CAD account with a Canadian entity). Foreign currency (FCY) means that the currency of the account is not the same as the country in which it is domiciled (e.g., a GBP account with an Australian entity). Cross-border transfer types may include, for example:

LCY to LCY (e.g., CAD account in Canada to a GBP account in UK);

LCY to FCY (e.g., CAD account in Canada to a GBP account in Australia); and

FCY to FCY (e.g., CAD account in France to a GBP account in Australia).

In some cases, cross-border transfers may have No FX Required (e.g., CAD account in Canada to a CAD account in Hong Kong, or USD account in Canada to a USD account in Hong Kong).

Figure 11:
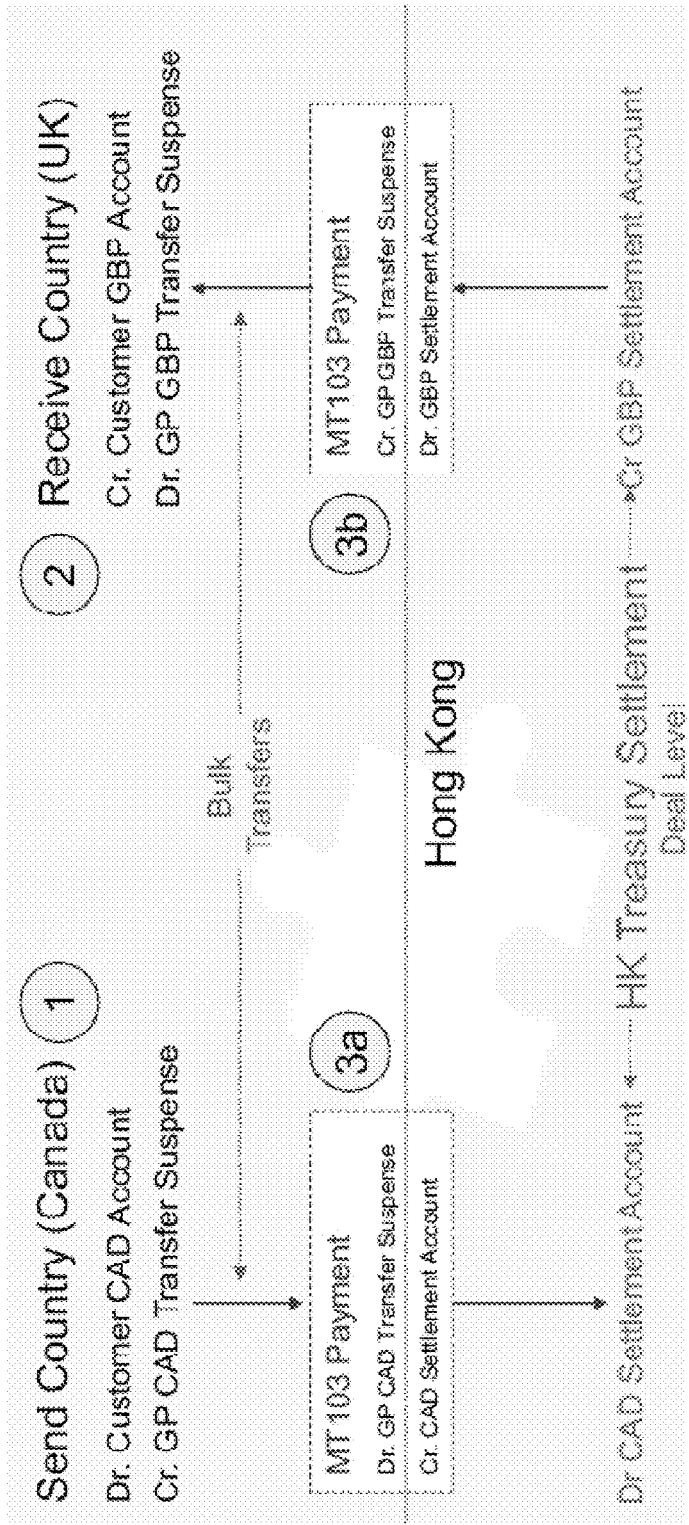
FIG. 11 shows an exemplary Accounting Business Flow for supported currencies (local currency to local currency).
Figure 12:
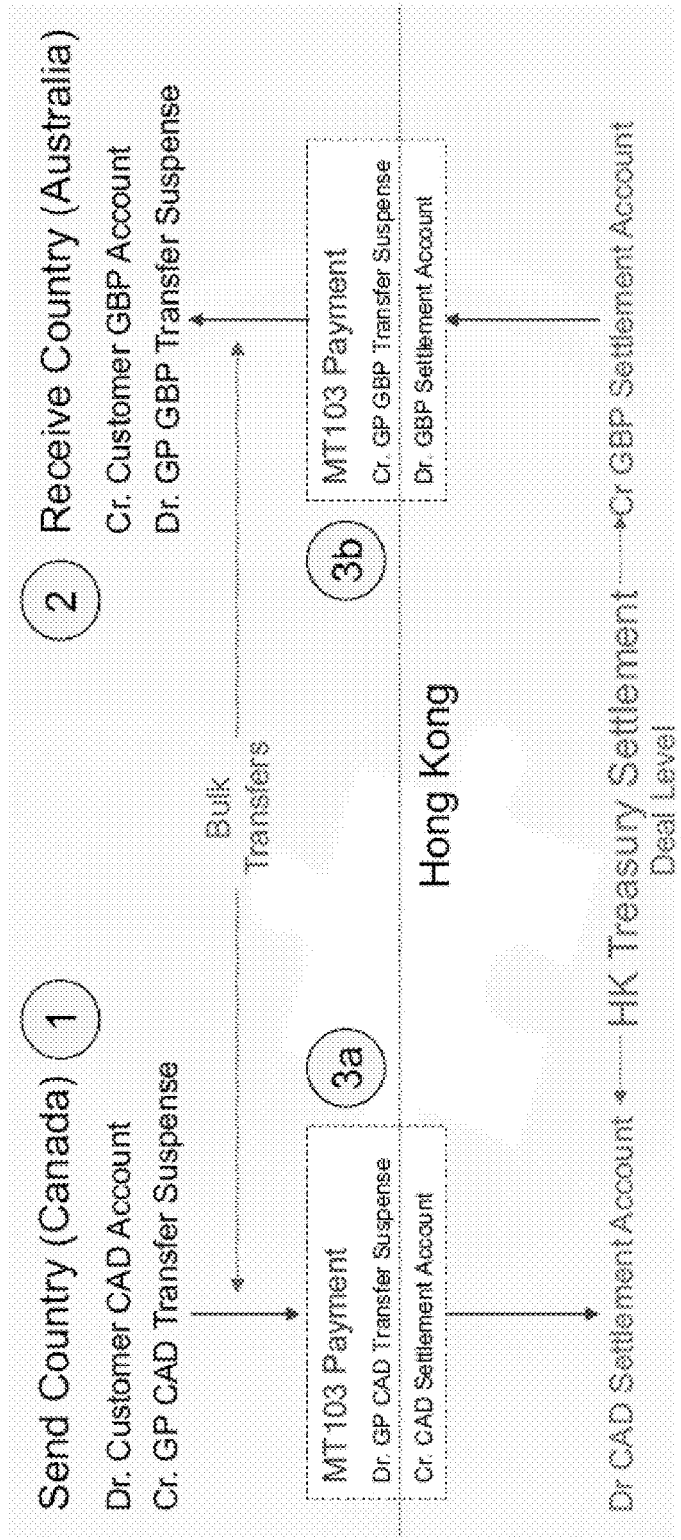
FIG. 12 shows an exemplary Accounting Business Flow for supported currencies (local currency to foreign currency).
Figure 13:
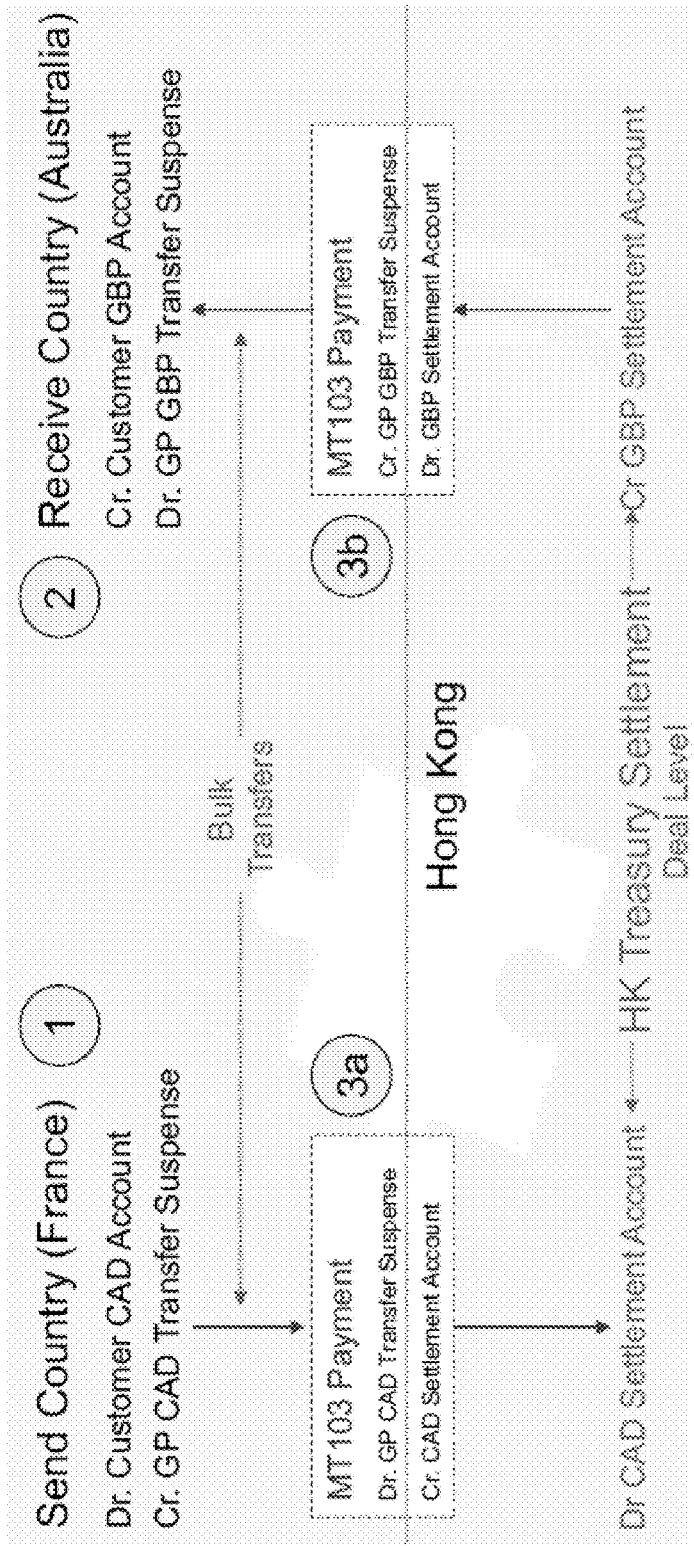
FIG. 13 shows an exemplary Accounting Business Flow for supported currencies (foreign currency to foreign currency).
Figure 14:
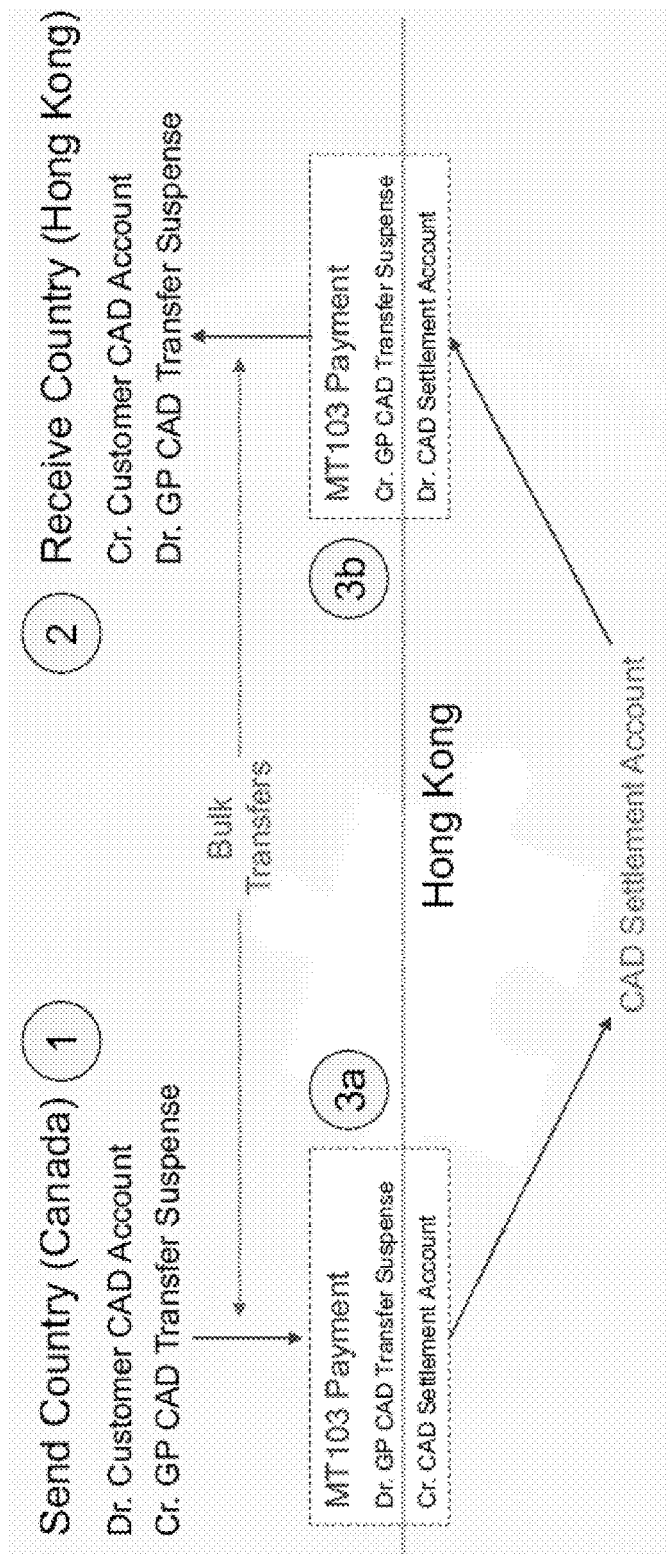
FIG. 14 shows an exemplary Accounting Business Flow for supported currencies (local currency to foreign currency, no foreign exchange required).
Figure 15:
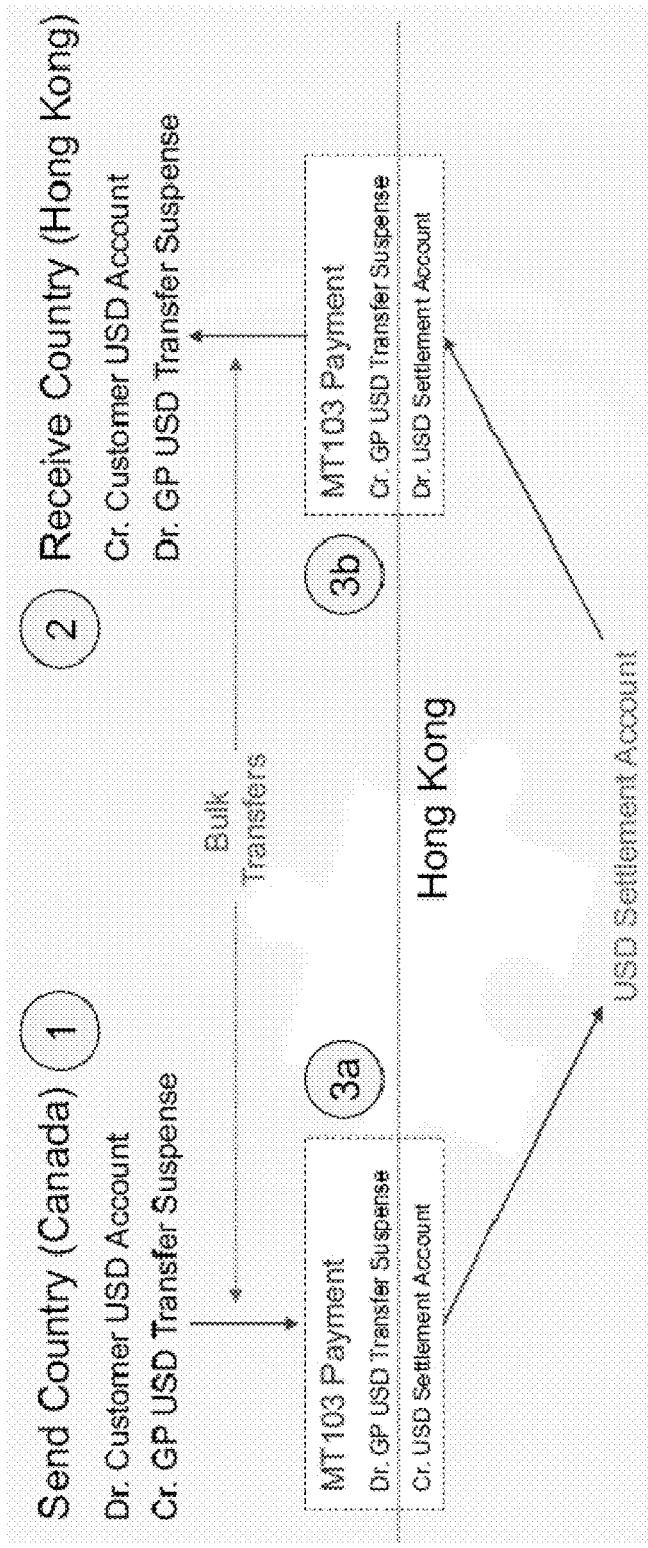
FIG. 15 shows an exemplary Accounting Business Flow for supported currencies (foreign currency to foreign currency, no foreign exchange required).

Referring to FIG. 11, an exemplary Accounting Business Flow is shown for a transfer from local currency to local currency, in which a foreign exchange was made. (Here, both currencies are supported, and the FX deal may have been made, for example, as described above, using real time rates from the Hong Kong Treasury, optionally obtained by FXM RFQ. If one or both of the currencies in the pair was unsupported, the FX deal may have been made using real time rates from one or more Local Treasuries, obtained by FXM RFQ.) In FIG. 11, the entity Debit Side Entity, GT Operational Accounts 250 and Credit Side Entity, GT Operational Accounts 350 in FIG. 1 are labeled as Dr. GP (Global Premier) GBP Transfer Suspense and Cr. GP CAD Transfer Suspense Accounts, and the Dr/Cr CCY Accounts 122, 124 are labeled as Dr CAD Settlement Account and CR GBP Settlement Account. As described above, steps 1 and 2 (labeled "Real time Fund Movement" 260, 360 in FIG. 1) are preferably performed in real time, or near real time (in the same unit of work, in system terms). These are the Online Enact steps that begin the transaction. Steps 3*a* and 3*b* (Debit Settlement and Credit Settlement, respectively; each labeled "DR Batch Settlement" 170, 270, "CR Batch Settlement" 370 in FIG. 1) may be performed at a predetermined later time (e.g., at the end of the day). For Treasury Settlement, the Debit and Credit Settlement Accounts may be debited and credited by the Treasury on a deal level.

Figure 16:
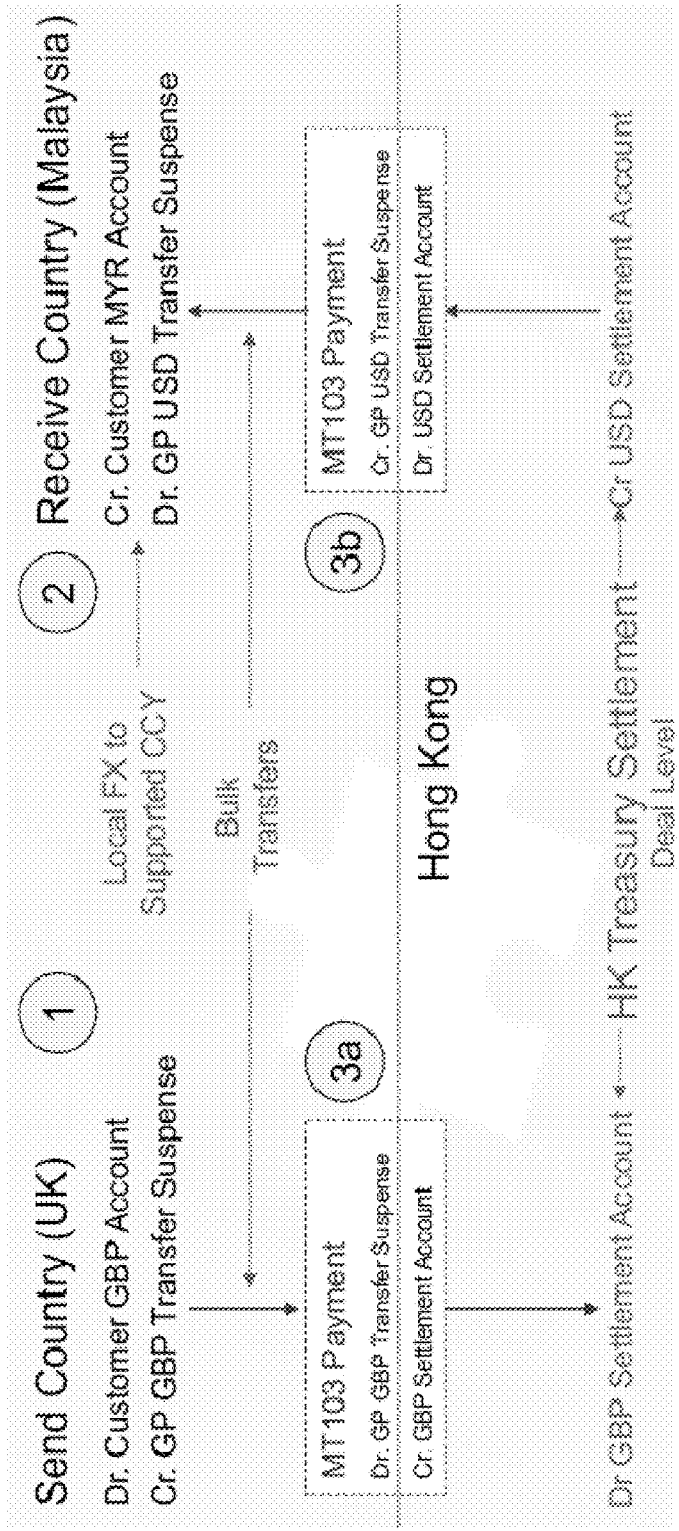
FIG. 16 shows an exemplary Accounting Business Flow for supported currency to unsupported currency, according to some embodiments.
Figure 17:
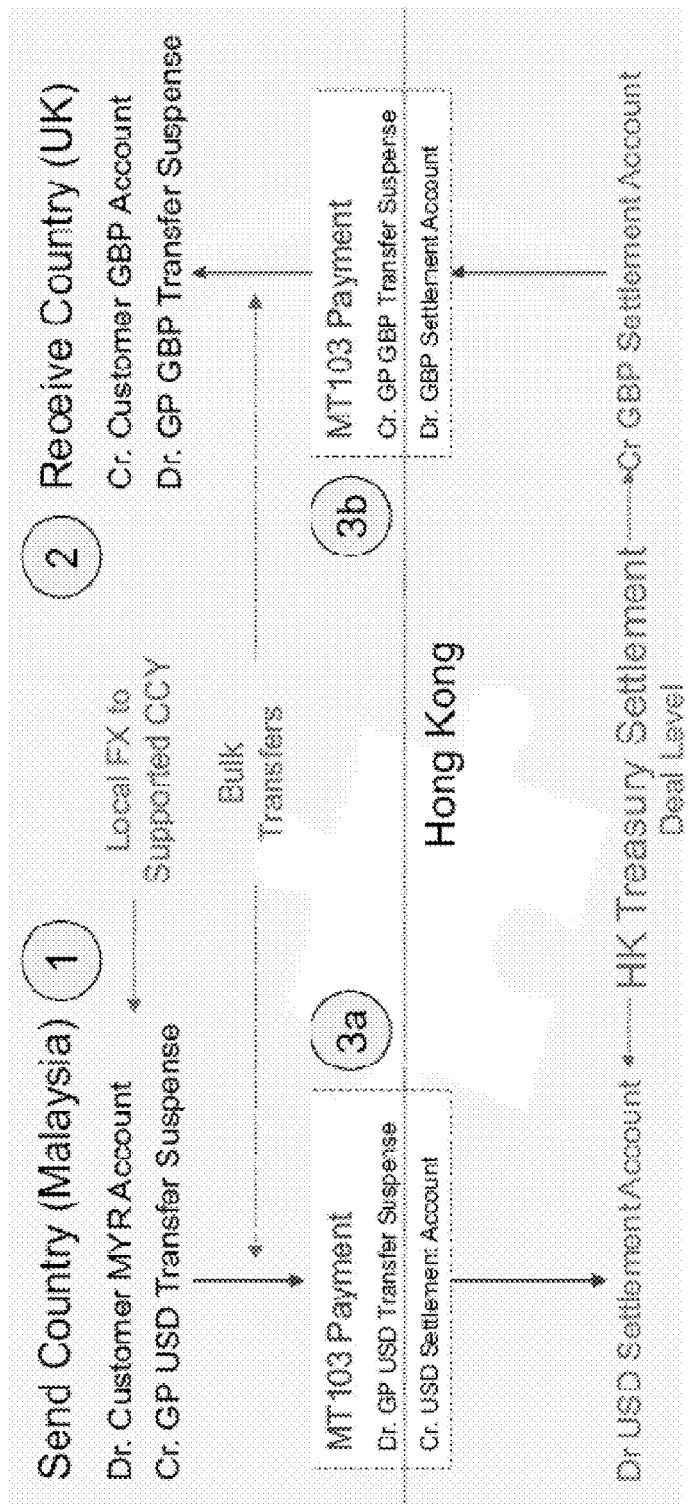
FIG. 17 shows an exemplary Accounting Business Flow for unsupported currency to supported currency, according to some embodiments.
Figure 18:
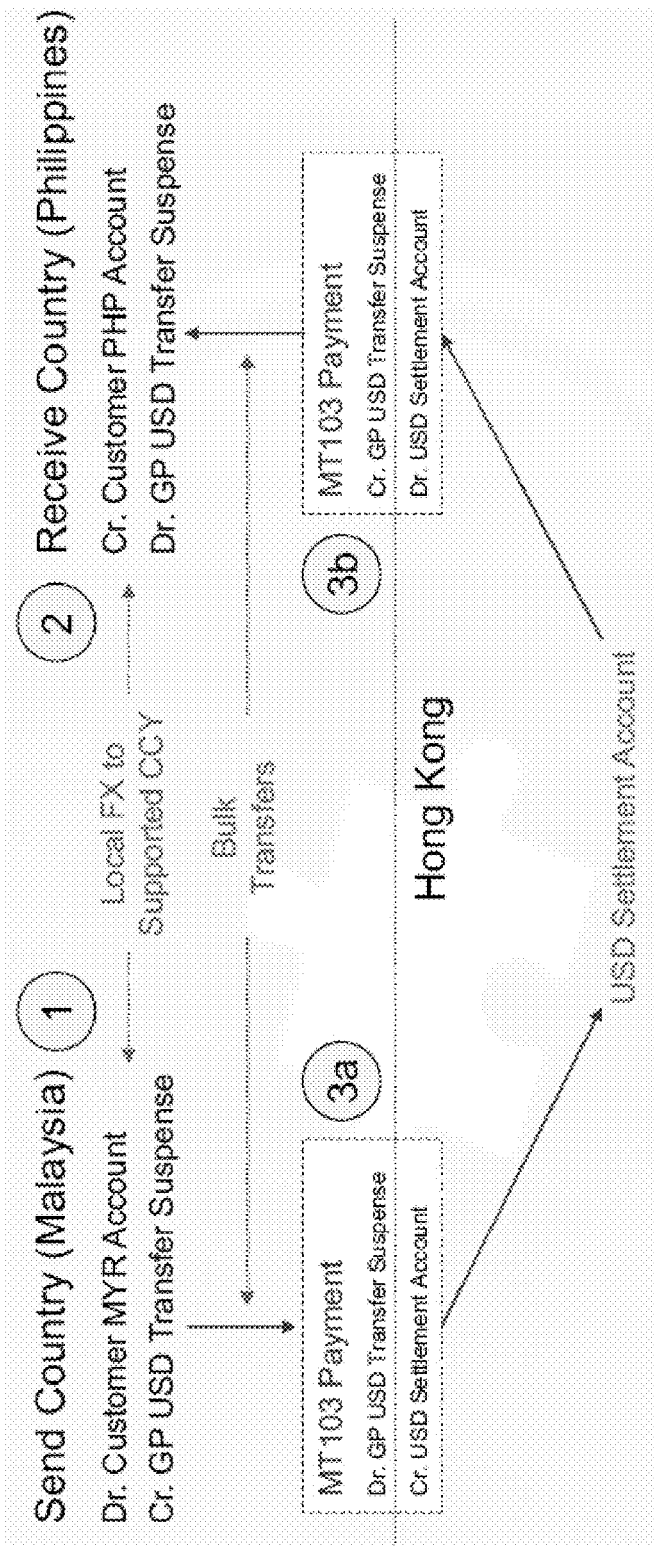
FIG. 18 shows an exemplary Accounting Business Flow for unsupported currency to unsupported currency, according to some embodiments.
Figure 19:
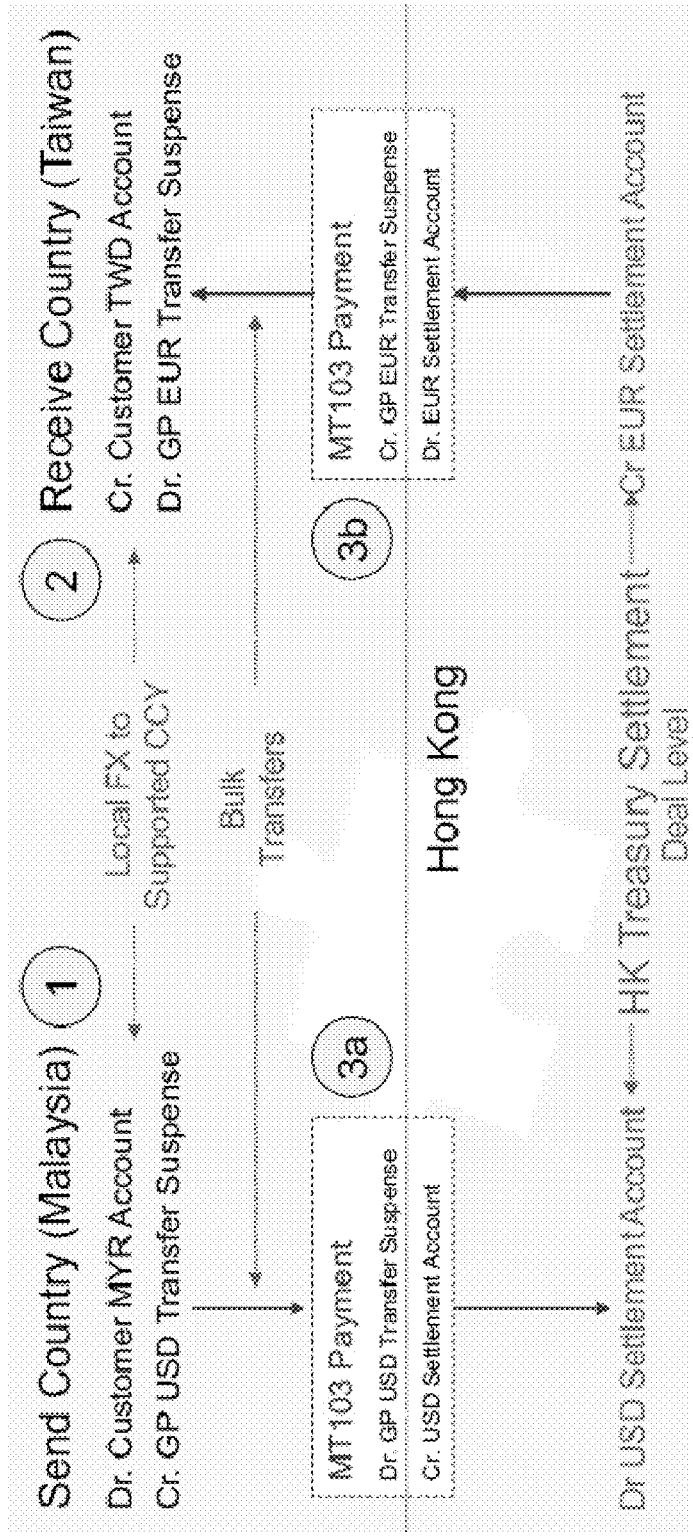
FIG. 19 shows an alternative exemplary Accounting Business Flow for unsupported currency to unsupported currency, according to some embodiments.

In some embodiments, if the transfer involves an unsupported currency that can only be traded onshore in that country, steps 1 and/or 2 will include a local FX from the unsupported currency to a base currency that is supported. FIGS. 16-17 show exemplary Accounting Business Flows for supported currency to unsupported currency, and unsupported currency to supported currency, respectively, under this scenario. In FIGS. 16-17, both currencies are local currencies (GBP in UK and MYR in Malaysia). MYR can only be bought onshore. Local FX to supported currency uses USD as the base currency. In alternative embodiments, the base currency may be GBP instead of USD, in which case no FX would be required in Hong Kong. FIGS. 18-19 show two alternative exemplary Accounting Business Flows for unsupported currency to unsupported currency under this scenario, the first using the same base currency, and the second using different base currencies. Other accounting methods may be used.

In some embodiments, as part of the reconciliation process, each operational account and settlement account may generate a message (e.g., MT940, established by SWIFT for the paperless transmission of account information) at the end of the day to report its transaction activities and/or balance information. In some embodiments, an electronic account statement is received by a GDi Reconciliation Tool from each banking system for each of its accounts (see "DR TXN Summary" 280 and "CR TXN Summary" 380 in FIG. 1). For example, at the end of the day, each entity generates an outward MT940 382 to GDi 102 to report the transaction activities of each of its operational accounts. At the end of the day in Hong Kong, Hong Kong generates an outward MT940 182 to GDi 102 to report the transaction activities of each of its settlement accounts. Bulk or batch posting items (e.g., net payments to/from the entity operational accounts) can be effectively replaced with the underlying customer transfers using identification and matching based, for example, on reference number and amount. Staff can use the GDi Reconciliation Tool to view and track any outstanding transactions that have not yet been reconciled. In various embodiments, the reconciliation tool may feature one or more of the following: ageing analysis, manual matching, partial matching, audit trails, input reports, and/or dual control.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. A global transfers of supported and unsupported currencies between accounts held by the same user computer system architecture processing a real time rate request from a customer, comprising:
   a global treasury system that processes first foreign exchange (FX) rates for first currencies supported by a global treasury to determine first transfer FX rates and comprising at least one processor and a memory comprising program instructions, wherein the program instructions are executable by the at least one processor;
   a local treasury system that process FX rates for currencies not supported by the global treasury to determine transfer FX rates and comprising at least one processor and a memory comprising program instructions, wherein the program instructions are executable by the at least one processor;
   a control system comprising at least one processor and a memory comprising program instructions, wherein the program instructions are executable by the at least one processor which when executed:
      receive, by a global customer data application executed on the control system, customer information including a plurality of personal internet banking system (FIB) profiles of information for a customer having accounts with a registered internet bank in more than one country where the bank is subject to a plurality of global treasury jurisdictions of that country, each global treasury having a respective transfer rate for that country;
      store, in a centralized customer database residing in the control system by the global customer data application, the customer information including the FIB profile information, where the FIB profiles for a customer for each bank account are linked, where the linked profiles are used for single sign on (SSO) when accessing that customer's accounts in different countries and for a global view of all international accounts that provides for global transfer between customer accounts;
      receive, at a front end application portlet executed on the control system, electronic global transfer instructions from a customer associated with a customer, wherein the front end application portlet is configured to provide integration into a personal internet banking system (FIB) of the customer and capture and validate amended instructions received from the customer computer, where the global customer data application authenticates the FIB of the customer, and upon authentication, provides the customer with access to linked PIBs for that customer all countries which that customer has accounts without requiring the customer to verify the PIBs in any other country's account;
      generate a user interface, by the control system, where the user interface comprises a country selection portlet executed on the control system, by retrieving a list of customer-linked profiles from a regional SSO server, displaying a list of countries that are electronically linked and owned by the customer and are available for global transfers;
      receive, at a transfer portlet executed on the control system, selections of countries that are to transfer funds from a debited side account to a credit side account from the customer computer, and verifying that the two countries selected by the customer are transactable;
      process, by a global transfers application executed on the control system, the electronic global transfer instructions received by the front end application portlet and the user interface at an enterprise application interface displayed from the customer computer and, responsive to said processing the electronic global transfer instructions, generate an electronic global transfer message to process an automatic transfer of funds from a debit side account of the customer with a debit side bank in a debit side country having debit side country specific requirements and rates to a credit side account of the customer with a credit side bank in a credit side country having credit side country specific requirements and rates, wherein the electronic global transfer message comprises a FX electronic transfer instruction or a non-FX electronic transfer instruction to be used in the automatic transfer between the debit side account in the debit side country and the credit side account in the credit side country;
      wherein the global customer data application is configured to process an automated linking validation comprising electronically verify that a debit side profile associated with the debit side account in the debit side country and a credit side profile associated with the credit side account in the credit side country correspond to the same customer information, and generate a linking validation result responsive thereto;
      where the automated linking validation further comprises analyzing at least one of front end (FE) updates to a regional single sign on (SSO) server, customer service representative (CSR) updates to the regional SSO server, SSO linking notifications to the global customer data application, global customer data application customer information retrieved from an entity system, and same person validation status retrieved using global name recognition (GNR);
      wherein the global transfers application is configured to electronically connect with the global customer data application to process a transfer authorization comprising electronically retrieve the linking validation result, electronically retrieve security compliance data matching (SCDM) scanning information for the customer account from the centralized customer database, and generate a transfer authorization result responsive thereto, wherein the SCDM provides a watchlist scan that performs a global compliance authorization check on the customer;
      where, when at least one of the debit side account in the debit side country and the credit side account in the credit side country has one or more joint parties for whom there is no SCDM scanning information stored in the centralized customer database, the global transfers application is configured to electronically connect with a third party system to perform a real time global compliance check for the joint parties;
      receive, at a foreign exchange application executed on the control system electronically connected to the local treasury system and global treasury system by a treasury application programming interface, real time rates for FX transfers, and process the real time rates when determining transfer FX rates that are used in the automatic transfer between the debit side account in the debit side country and the credit side account in the credit side country, wherein the foreign exchange application interfaces in real-time with a global treasury system to process debit side FX rates for currencies supported by the global treasury to determine debit side transfer FX rates, and wherein the foreign exchange application interfaces with the local treasury system to process credit side FX rates for currencies unsupported by the global treasury to determine credit side transfer FX rates, where the foreign exchange application is further configured to cache the rates for all the currency pairs and store them in the foreign exchange management application processor, and use cached rates during outages and weekend transfers;

where the foreign exchange application comprises a foreign exchange management application process to generate and electronically transmit to the local treasury system an electronic request for quote (RFQ) to obtain the credit side FX rates for unsupported currencies to execute said processing by the at least one central processing unit to determine the credit side transfer FX rates, wherein the foreign exchange application is configured to generate a separate RFQ for each transaction, enabling a single deal per transaction; and wherein the foreign exchange application comprises a foreign exchange aggregation application process to obtain the debit side FX rates for supported currencies streamed in real-time from the global treasury system to execute said processing by the at least one central processing unit to determine the debit side transfer FX rates;

wherein the global transfers application is further configured to execute the automatic transfer between the debit side account in the debit side country and the credit side account in the credit side country responsive to the transfer authorization result.

2. The global transfers computer system of claim 1, wherein the foreign exchange computer application is configured to cache the real time rates at a predetermined time.

3. The global transfers computer system of claim 1, wherein the transfer portlet is configured so that the FX rate electronically displayed on a review page is the same as the FX rate electronically displayed on a confirmation page, and comprises a final rate.

4. The global transfers computer system of claim 1, wherein the transfer portlet is configured so that the FX rate electronically displayed on a review page comprises an indicative rate responsive to a centralized multi base currency configuration, and the FX rate electronically displayed on a confirmation page comprises a final rate.

5. The global transfers computer system of claim 1, wherein the global transfers computer application is configured to electronically provide different rates to different customers based on predetermined criteria.

6. The global transfers computer system of claim 5, wherein the predetermined criteria comprise at least one of proposition, global proposition, tier, transfer amount, and transaction volume.

7. The global transfers computer system of claim 1, wherein the global transfers computer application is configured to provide different rates to different customers based on global proposition.

8. The global transfers computer system of claim 7, wherein the global transfers computer application is configured to apply a globally consistent default spread for each proposition.

9. The global transfers computer system of claim 1, wherein the electronic global transfer instructions comprise electronic instructions to perform at least one of an immediate transfer, a future transfer, and a recurring transfer.

10. The global transfers computer system of claim 1, wherein the global transfers computer application includes at least one of a computerized customer service representative component and a computerized reconciliation component providing administrative functionality for staff users.

11. The global transfers computer system of claim 1, wherein the global transfers computer application is configured to perform automated distribution of FX income to the credit side bank and debit side bank.

12. The global transfers computer system of claim 1, wherein the global transfers computer application is configured to electronically receive transaction summaries from a plurality of operational and settlement accounts.

13. The global transfers computer system of claim 1, wherein the global transfers computer application is configured to generate one or more FX income reports reporting FX income by proposition.

14. The global transfers computer system architecture of claim 1, wherein the transfer portlet is configured to electronically receive customer confirmation of transfer details, and to electronically transmit a data message to the global transfers computer application to execute the automatic transfer responsive to the customer confirmation.

15. The global transfers computer system architecture of claim 1, wherein the front end portlet is configured to receive updated electronic global transfer instructions for at least one of a future transfer and a recurring transfer.

16. The global transfers computer system architecture of claim 1, wherein the front end portlet provides an FX calculator user interface functionality to display a list of currencies eligible for foreign exchange rate calculation, to receive from the customer computer a selection of currencies and an amount to be converted, and to display a conversion amount responsive thereto.

17. A computer implemented method for performing global transfers of supported and unsupported currencies between accounts held by the same user comprising:

receiving, by a global customer data application running on a control system, customer information including a plurality of personal internet banking system (FIB) profiles of information for a customer having accounts with a registered internet bank in more than one country where the bank is subject to a plurality of global treasury jurisdictions of that country, each global treasury having a respective transfer rate for that country;

storing, in a centralized customer database residing in the control system by the global customer data application, the customer information including the FIB profile information, where the FIB profiles for a customer for each bank account are linked, where the linked profiles are used for single sign on (SSO) when accessing that customer's accounts in different countries and for a global view of all international accounts that provides for global transfer between customer accounts;

receiving, at a front end application portlet running on the control system, electronic global transfer instructions from a customer associated with a customer, wherein the front end application portlet is configured to provide integration into a personal internet banking system (FIB) of the customer and capture and validate amended instructions received from the customer computer, where the global customer data application authenticates the FIB of the customer, and upon authentication, provides the customer with access to linked PIBs for that customer all countries which that customer has accounts without requiring the customer to verify the PIBs in any other country's account;

generating a user interface, by the control system, where the user interface comprises a country selection portlet running on the control system, by retrieving a list of customer-linked profiles from a regional SSO server, displaying a list of countries that are electronically linked and owned by the customer and are available for global transfers, receiving, at a transfer portlet running on the control system, selections of countries that are to transfer funds from a debited side account to a credit side account from the customer computer, and verifying that the two countries selected by the customer are transactable;

processing, by a global transfers application running on the control system, the electronic global transfer instructions received by the front end application portlet and the user interface at an enterprise application interface displayed from the customer computer and, responsive to said processing the electronic global transfer instructions, generating an electronic global transfer message to process an automatic transfer of funds from a debit side account of the customer with a debit side bank in a debit side country having debit side country specific requirements and rates to a credit side account of the customer with a credit side bank in a credit side country having credit side country specific requirements and rates, wherein the electronic global transfer message comprises a FX electronic transfer instruction or a non-FX electronic transfer instruction to be used in the automatic transfer between the debit side account in the debit side country and the credit side account in the credit side country;

wherein the global customer data application is configured to process an automated linking validation comprising electronically verifying that a debit side profile associated with the debit side account in the debit side country and a credit side profile associated with the credit side account in the credit side country correspond to the same customer information, and generate a linking validation result responsive thereto;

where the automated linking validation further comprises analyzing at least one of front end (FE) updates to a regional single sign on (SSO) server, customer service representative (CSR) updates to the regional SSO server, SSO linking notifications to the global customer data application, global customer data application customer information retrieved from an entity system, and same person validation status retrieved using global name recognition (GNR);

wherein the global transfers application is configured to electronically connect with the global customer data application to process a transfer authorization comprising electronically retrieving the linking validation result, electronically retrieving security compliance data matching (SCDM) scanning information for the customer account from the centralized customer database, and generating a transfer authorization result responsive thereto, wherein the SCDM provides a watchlist scan that performs a global compliance authorization check on the customer;

where, when at least one of the debit side account in the debit side country and the credit side account in the credit side country has one or more joint parties for whom there is no SCDM scanning information stored in the centralized customer database, the global transfers application is configured to electronically connect with a third party system to perform a real time global compliance check for the joint parties;

receiving, at a foreign exchange application running on the control system electronically connecting to the local treasury system and global treasury system by a treasury application programming interface, real time rates for FX transfers, and processing the real time rates when determining transfer FX rates that are used in the automatic transfer between the debit side account in the debit side country and the credit side account in the credit side country, wherein the foreign exchange application interfaces in real-time with a global treasury system to process debit side FX rates for currencies supported by the global treasury to determine debit side transfer FX rates, and wherein the foreign exchange application interfaces with the local treasury system to process credit side FX rates for currencies unsupported by the global treasury to determine credit side transfer FX rates, where the foreign exchange application is further configured to cache the rates for all the currency pairs and store them in the foreign exchange management application processor, and use cached rates during outages and weekend transfers;

where the foreign exchange application comprises a foreign exchange management application process to generate and electronically transmit to the local treasury system an electronic request for quote (RFQ) to obtain the credit side FX rates for unsupported currencies to execute said processing by the at least one central processing unit to determine the credit side transfer FX rates, wherein the foreign exchange application is configured to generate a separate RFQ for each transaction, enabling a single deal per transaction; and wherein the foreign exchange application comprises a foreign exchange aggregation application process to obtain the debit side FX rates for supported currencies streamed in real-time from the global treasury system to execute said processing by the at least one central processing unit to determine the debit side transfer FX rates;

wherein the global transfers application is further configured to execute the automatic transfer between the debit side account in the debit side country and the credit side account in the credit side country responsive to the transfer authorization result;

where the control system, global treasury system, and local treasury system comprise at least one processor and a memory comprising program instructions, wherein the program instructions are executable by the at least one processor.

18. The computer implemented method for performing global transfers of claim 17, further comprising caching the real time rates, by the at least one computer implementing the foreign exchange computer application, at a predetermined time.

19. The computer implemented method for performing global transfers of claim 17, further comprising electronically displaying on a review page, by the user interface, the same FX rate as is electronically displayed on a confirmation page, wherein the FX rate displayed on the review page is a final rate.

20. The computer implemented method for performing global transfers of claim 17, further comprising electronically displaying on a review page, by the user interface, an indicative rate responsive to a centralized multi base currency configuration, and electronically displaying on a confirmation page, by the user interface, a final rate.

21. The computer implemented method for performing global transfers of claim 17, further comprising electronically providing different rates to different customers, by the global transfers computer application, based on predetermined criteria.

22. The computer implemented method for performing global transfers of claim 21, wherein the predetermined criteria comprise at least one of proposition, global proposition, tier, transfer amount, and transaction volume.

23. The computer implemented method for performing global transfers of claim 17, further comprising electronically providing different rates to different customers, by the global transfers computer application, based on global proposition.

24. The computer implemented method for performing global transfers of claim 23, further comprising applying, by the global transfers computer application, a globally consistent default spread for each proposition.

25. The computer implemented method for performing global transfers of claim 17, wherein the electronic global transfer instructions comprise electronic instructions to perform at least one of an immediate transfer, a future transfer, and a recurring transfer.

26. The computer implemented method for performing global transfers of claim 17, further comprising providing administrative functionality for staff users, by the global transfers computer application, via at least one of a computerized customer service representative component and a computerized reconciliation component.

27. The computer implemented method for performing global transfers of claim 17, further comprising performing, by the global transfers computer application, automated distribution of FX income to the credit side bank and debit side bank.

28. The computer implemented method for performing global transfers of claim 17, further comprising electronically receiving, by the global transfers computer application, transaction summaries from a plurality of operational and settlement accounts.

29. The computer implemented method for performing global transfers of claim 17, further comprising generating, by the global transfers computer application, one or more FX income reports reporting FX income by proposition.

* * * * *